(12) United States Patent
Shimanovsky et al.

(10) Patent No.: US 10,831,725 B2
(45) Date of Patent: Nov. 10, 2020

(54) APPARATUS, SYSTEMS, AND METHODS FOR GROUPING DATA RECORDS

(71) Applicant: FACTUAL INC., Los Angeles, CA (US)

(72) Inventors: Boris Shimanovsky, Los Angeles, CA (US); Manuel Lagang, Pasadena, CA (US); Leonid Polovets, Menlo Park, CA (US)

(73) Assignee: FACTUAL, INC., New York, NY (US)

( * ) Notice: Subject to any disclaimer, the term of this patent is extended or adjusted under 35 U.S.C. 154(b) by 955 days.

(21) Appl. No.: 14/214,231

(22) Filed: Mar. 14, 2014

(65) Prior Publication Data

US 2014/0279757 A1    Sep. 18, 2014

Related U.S. Application Data

(60) Provisional application No. 61/799,131, filed on Mar. 15, 2013, provisional application No. 61/799,846, (Continued)

(51) Int. Cl.
*G06F 16/21* (2019.01)
*G06N 5/02* (2006.01)
(Continued)

(52) U.S. Cl.
CPC ......... *G06F 16/21* (2019.01); *G05B 13/0265* (2013.01); *G06F 16/23* (2019.01); *G06F 16/235* (2019.01); *G06F 16/2379* (2019.01); *G06F 16/2386* (2019.01); *G06F 16/2477* (2019.01); *G06F 16/24564* (2019.01); *G06F 16/282* (2019.01); *G06F 16/285* (2019.01); *G06F 16/29* (2019.01); *G06F 16/313* (2019.01); *G06F 16/35* (2019.01); *G06F 16/951* (2019.01); *G06N 5/022* (2013.01); *G06N 20/00* (2019.01);
(Continued)

(58) Field of Classification Search
None
See application file for complete search history.

(56) References Cited

U.S. PATENT DOCUMENTS

| 584,791 A | 6/1897 | Propst |
|---|---|---|
| 5,701,467 A | 12/1997 | Freeston |

(Continued)

FOREIGN PATENT DOCUMENTS

| CN | 102004793 A | 4/2011 |
|---|---|---|
| CN | 102955792 A | 3/2013 |

(Continued)

OTHER PUBLICATIONS

R. Baraglia, G. De Francisci Morales, C. Lucchese, "Document Similarity Self-Join with MapReduce", Data Mining (ICDM), 2010 IEEE 10th International Conference on, Dec. 13, 2010, pp. 731-736.*

(Continued)

*Primary Examiner* — Daniel T Pellett

(57) ABSTRACT

The present application relates to apparatus, systems, and methods for grouping data records based on entities referenced by the data records. The disclosed grouping mechanism can include determining a pair-wise similarity between a large number of data records, and clustering a subset of the data records based on their pair-wise similarity.

22 Claims, 9 Drawing Sheets

Related U.S. Application Data filed on Mar. 15, 2013, provisional application No. 61/799,817, filed on Mar. 15, 2013, provisional application No. 61/799,986, filed on Mar. 15, 2013, provisional application No. 61/800,036, filed on Mar. 15, 2013.

(51) Int. Cl.

| | | |
|---|---|---|
| G06N 20/00 | (2019.01) | |
| G06F 16/23 | (2019.01) | |
| G06F 16/29 | (2019.01) | |
| G06F 16/35 | (2019.01) | |
| G06F 16/28 | (2019.01) | |
| G06F 16/31 | (2019.01) | |
| G06F 16/951 | (2019.01) | |
| G06F 16/2458 | (2019.01) | |
| G06F 16/2455 | (2019.01) | |
| G06Q 10/10 | (2012.01) | |
| G06Q 50/00 | (2012.01) | |
| G05B 13/02 | (2006.01) | |
| H04W 4/029 | (2018.01) | |
| H04W 76/38 | (2018.01) | |
| H04W 4/50 | (2018.01) | |
| G06Q 30/02 | (2012.01) | |
| H04L 12/24 | (2006.01) | |
| H04W 4/02 | (2018.01) | |
| H04W 4/021 | (2018.01) | |
| H04W 8/08 | (2009.01) | |
| H04W 8/16 | (2009.01) | |
| H04W 8/18 | (2009.01) | |
| H04W 16/24 | (2009.01) | |
| H04W 64/00 | (2009.01) | |
| H04W 88/02 | (2009.01) | |
| G06F 16/335 | (2019.01) | |
| H04W 16/00 | (2009.01) | |
| H04W 16/30 | (2009.01) | |
| H04W 16/32 | (2009.01) | |
| H04W 88/00 | (2009.01) | |

(52) U.S. Cl.
CPC ....... *G06Q 10/101* (2013.01); *G06Q 30/0261* (2013.01); *G06Q 30/0282* (2013.01); *G06Q 50/01* (2013.01); *H04L 41/14* (2013.01); *H04W 4/02* (2013.01); *H04W 4/021* (2013.01); *H04W 4/025* (2013.01); *H04W 4/029* (2018.02); *H04W 4/50* (2018.02); *H04W 8/08* (2013.01); *H04W 8/16* (2013.01); *H04W 8/18* (2013.01); *H04W 16/24* (2013.01); *H04W 64/00* (2013.01); *H04W 64/003* (2013.01); *H04W 76/38* (2018.02); *H04W 88/02* (2013.01); *G06F 16/337* (2019.01); *H04W 16/00* (2013.01); *H04W 16/30* (2013.01); *H04W 16/32* (2013.01); *H04W 88/00* (2013.01)

(56) References Cited

U.S. PATENT DOCUMENTS

| | | |
|---|---|---|
| 6,212,393 B1 | 4/2001 | Suarez et al. |
| 6,317,604 B1 | 11/2001 | Kovach, Jr. et al. |
| 6,360,261 B1 | 3/2002 | Boyd et al. |
| 6,594,791 B2 | 7/2003 | Sipola |
| 7,058,639 B1 | 6/2006 | Chatterjee et al. |
| 7,096,214 B1 | 8/2006 | Bharat et al. |
| 7,137,065 B1 | 11/2006 | Huang et al. |
| 7,271,765 B2 | 9/2007 | Stilp et al. |
| 7,330,850 B1 | 2/2008 | Seibel et al. |
| 7,539,666 B2 | 5/2009 | Ashworth et al. |
| 7,576,754 B1 | 8/2009 | Joseph et al. |
| 7,577,680 B1 | 8/2009 | Williams et al. |
| 7,734,661 B2 | 6/2010 | Jordan et al. |
| RE42,285 E | 4/2011 | Anderson et al. |
| 8,015,185 B2 | 9/2011 | Choi et al. |
| 8,046,001 B2 | 10/2011 | Shalmon et al. |
| 8,126,825 B2 | 2/2012 | Guyon |
| 8,195,709 B2 | 6/2012 | Pulfer |
| 8,260,769 B1 | 9/2012 | Narieda et al. |
| 8,301,639 B1 | 10/2012 | Myllykmaki et al. |
| 8,326,845 B2 | 12/2012 | Sethi et al. |
| 8,489,596 B1 | 7/2013 | Milton et al. |
| 8,538,973 B1 | 9/2013 | Gonzalez et al. |
| 8,589,069 B1 | 11/2013 | Lehman |
| 8,670,716 B2 | 3/2014 | Yu et al. |
| 8,751,427 B1 | 6/2014 | Mysen et al. |
| 8,843,315 B1 | 9/2014 | Barbeau et al. |
| 8,855,681 B1 | 10/2014 | George et al. |
| 8,909,255 B1 | 12/2014 | Eriksson et al. |
| 8,918,284 B1 | 12/2014 | Tokashiki |
| 8,977,284 B2 | 3/2015 | Reed |
| 9,063,226 B2 | 6/2015 | Zheng et al. |
| 9,317,541 B2 | 4/2016 | Shimanovsky et al. |
| 9,544,075 B2 | 1/2017 | Altman et al. |
| 9,594,791 B2 | 3/2017 | Bell et al. |
| 9,600,501 B1 | 3/2017 | Fuller |
| 9,686,646 B1 | 6/2017 | Pecard et al. |
| 9,720,555 B2 | 8/2017 | Sorden et al. |
| 9,736,652 B2 | 8/2017 | Su et al. |
| 9,743,236 B1 | 8/2017 | Pecard et al. |
| 9,753,965 B2 | 9/2017 | Rana et al. |
| 9,801,095 B2 | 10/2017 | Henderson et al. |
| 9,906,906 B1 | 2/2018 | Pecard et al. |
| 9,950,532 B2 | 4/2018 | Togashi et al. |
| 9,977,792 B2 | 5/2018 | Bell et al. |
| 10,013,446 B2 | 7/2018 | Rana et al. |
| 10,255,301 B2 | 4/2019 | Bell et al. |
| 10,268,708 B2 | 4/2019 | Rana et al. |
| 10,324,935 B1 | 6/2019 | Patton |
| 10,353,934 B1 | 7/2019 | Mehta et al. |
| 10,397,757 B1 | 8/2019 | Gratton et al. |
| 10,459,896 B2 | 10/2019 | Rana et al. |
| 10,484,856 B1 | 11/2019 | Leung et al. |
| 10,579,600 B2 | 3/2020 | Bell et al. |
| 2001/0036224 A1 | 11/2001 | Demello et al. |
| 2002/0138571 A1 | 9/2002 | Trinon et al. |
| 2002/0188581 A1 | 12/2002 | Fortin et al. |
| 2003/0036848 A1 | 2/2003 | Sheha et al. |
| 2003/0135486 A1 | 7/2003 | Edlund et al. |
| 2003/0204484 A1 | 10/2003 | Charpiot et al. |
| 2004/0181526 A1* | 9/2004 | Burdick ............... G06F 19/00 |
| 2004/0185863 A1 | 9/2004 | Ogami |
| 2004/0254920 A1 | 12/2004 | Brill et al. |
| 2005/0073708 A1 | 4/2005 | Oh et al. |
| 2005/0096997 A1 | 5/2005 | Jain et al. |
| 2005/0134935 A1* | 6/2005 | Schmidtler ........ G06K 9/00442 |
| | | 358/448 |
| 2005/0240580 A1 | 10/2005 | Zamir et al. |
| 2006/0004850 A1 | 1/2006 | Chowdhury |
| 2006/0085177 A1 | 4/2006 | Toyama et al. |
| 2006/0149774 A1 | 7/2006 | Egnor |
| 2006/0195565 A1 | 8/2006 | De-Poorter |
| 2006/0248106 A1 | 11/2006 | Milne et al. |
| 2006/0253481 A1 | 11/2006 | Guido et al. |
| 2006/0277197 A1 | 12/2006 | Bailey |
| 2006/0287810 A1 | 12/2006 | Sadri et al. |
| 2007/0005556 A1* | 1/2007 | Ganti .................. G06F 16/27 |
| 2007/0030824 A1 | 2/2007 | Ribaudo et al. |
| 2007/0072582 A1 | 3/2007 | Nurmi |
| 2007/0088603 A1 | 4/2007 | Jouppi et al. |
| 2007/0100796 A1 | 5/2007 | Wang |
| 2007/0149216 A1 | 6/2007 | Misikangas |
| 2007/0245118 A1 | 10/2007 | Suponau et al. |
| 2007/0256006 A1 | 11/2007 | Myers |
| 2008/0077314 A1 | 3/2008 | Ishikawa |
| 2008/0248815 A1 | 10/2008 | Busch |
| 2009/0005968 A1 | 1/2009 | Vengroff et al. |
| 2009/0024546 A1 | 1/2009 | Ficcaglia et al. |

(56) References Cited

U.S. PATENT DOCUMENTS

| | | |
|---|---|---|
| 2009/0089149 A1 | 4/2009 | Lerner et al. |
| 2009/0106228 A1 | 4/2009 | Weinman, Jr. |
| 2009/0119222 A1 | 5/2009 | O'Neil et al. |
| 2009/0124241 A1 | 5/2009 | Krishnaswamy et al. |
| 2009/0125321 A1 | 5/2009 | Charlebois et al. |
| 2009/0132469 A1 | 5/2009 | White et al. |
| 2009/0132605 A1 | 5/2009 | Nielsen |
| 2009/0207021 A1 | 8/2009 | Naccache |
| 2009/0254838 A1 | 10/2009 | Rao et al. |
| 2009/0280829 A1 | 11/2009 | Feuerstein |
| 2009/0282019 A1 | 11/2009 | Galitsky et al. |
| 2009/0287405 A1 | 11/2009 | Liu et al. |
| 2009/0299952 A1 | 12/2009 | Zheng et al. |
| 2009/0302952 A1 | 12/2009 | Chan et al. |
| 2009/0319346 A1 | 12/2009 | Fogel et al. |
| 2010/0004997 A1 | 1/2010 | Mehata et al. |
| 2010/0023515 A1* | 1/2010 | Marx .................. G06F 16/285 707/E17.005 |
| 2010/0323715 A1 | 2/2010 | Winters |
| 2010/0079336 A1 | 4/2010 | Skibiski et al. |
| 2010/0185628 A1 | 7/2010 | Weda et al. |
| 2010/0214117 A1 | 8/2010 | Hazzani |
| 2011/0029853 A1 | 2/2011 | Garrity et al. |
| 2011/0145228 A1 | 6/2011 | Laurenzo |
| 2011/0208427 A1 | 8/2011 | Jansen et al. |
| 2011/0219226 A1 | 9/2011 | Olsson et al. |
| 2011/0225288 A1 | 9/2011 | Easterday et al. |
| 2011/0246059 A1 | 10/2011 | Feuerstein |
| 2011/0313969 A1 | 12/2011 | Ramu |
| 2011/0320319 A1 | 12/2011 | Streich |
| 2012/0028650 A1 | 2/2012 | Cooper et al. |
| 2012/0031032 A1 | 2/2012 | Deiss et al. |
| 2012/0047102 A1 | 2/2012 | Petersen et al. |
| 2012/0047184 A1 | 2/2012 | Purdy |
| 2012/0066218 A1 | 3/2012 | Rapp et al. |
| 2012/0084280 A1 | 4/2012 | Bouzas et al. |
| 2012/0100869 A1 | 4/2012 | Liang et al. |
| 2012/0110183 A1 | 5/2012 | Miranda et al. |
| 2012/0182144 A1 | 7/2012 | Richardson et al. |
| 2012/0185439 A1 | 7/2012 | Chen et al. |
| 2012/0185455 A1 | 7/2012 | Hedrevich |
| 2012/0191696 A1 | 7/2012 | Renkes et al. |
| 2012/0221231 A1 | 8/2012 | Nagata et al. |
| 2012/0221508 A1 | 8/2012 | Chaturvedi et al. |
| 2012/0226622 A1 | 9/2012 | Gonzalez et al. |
| 2012/0253862 A1 | 10/2012 | Davidson |
| 2012/0260209 A1 | 10/2012 | Stibel et al. |
| 2012/0278767 A1 | 11/2012 | Stibel et al. |
| 2012/0303745 A1 | 11/2012 | Lo et al. |
| 2012/0317110 A1 | 12/2012 | Butterfield et al. |
| 2012/0331014 A1 | 12/2012 | Skubacz et al. |
| 2013/0031032 A1 | 1/2013 | Mehta et al. |
| 2013/0066866 A1 | 3/2013 | Chan et al. |
| 2013/0066912 A1 | 3/2013 | Chetuparambil et al. |
| 2013/0073581 A1 | 3/2013 | Sandholm |
| 2013/0090130 A1 | 4/2013 | Burrell et al. |
| 2013/0103306 A1 | 4/2013 | Uetake |
| 2013/0103607 A1 | 4/2013 | Knipfer et al. |
| 2013/0103697 A1 | 4/2013 | Hill et al. |
| 2013/0103764 A1 | 4/2013 | Verkasalo |
| 2013/0157693 A1 | 6/2013 | Mercuri et al. |
| 2013/0183998 A1 | 7/2013 | Pylappan et al. |
| 2013/0210463 A1 | 8/2013 | Busch |
| 2013/0226857 A1 | 8/2013 | Shim et al. |
| 2013/0227026 A1 | 8/2013 | Jayaram et al. |
| 2013/0238540 A1 | 9/2013 | O'Donoghue et al. |
| 2013/0246175 A1 | 9/2013 | Bilange et al. |
| 2013/0250851 A1 | 9/2013 | Lakhzouri et al. |
| 2013/0262479 A1 | 10/2013 | Liang et al. |
| 2013/0267255 A1 | 10/2013 | Liu et al. |
| 2013/0304758 A1 | 11/2013 | Gruber et al. |
| 2013/0346347 A1 | 12/2013 | Patterson et al. |
| 2014/0115009 A1 | 4/2014 | Lashley et al. |
| 2014/0128105 A1 | 5/2014 | Su et al. |
| 2014/0270402 A1 | 9/2014 | Condell et al. |
| 2014/0274022 A1 | 9/2014 | Bell et al. |
| 2014/0274154 A1 | 9/2014 | Rana et al. |
| 2014/0278838 A1 | 9/2014 | Novak |
| 2014/0279674 A1 | 9/2014 | Michels et al. |
| 2014/0279757 A1 | 9/2014 | Shimanovsky et al. |
| 2014/0279811 A1 | 9/2014 | Su et al. |
| 2014/0289188 A1 | 9/2014 | Shimanovsky et al. |
| 2015/0081717 A1 | 3/2015 | Pidduck |
| 2015/0319574 A1 | 11/2015 | Wachter et al. |
| 2016/0232192 A1 | 8/2016 | Shimanovsky et al. |
| 2017/0206223 A1 | 7/2017 | Bell et al. |
| 2018/0011888 A1 | 1/2018 | Rana et al. |

FOREIGN PATENT DOCUMENTS

| | | |
|---|---|---|
| WO | WO 2002/010989 A2 | 2/2002 |
| WO | WO 2014/145059 A2 | 9/2014 |
| WO | WO 2014/145069 A1 | 9/2014 |
| WO | WO 2014/145076 A2 | 9/2014 |
| WO | WO 2014/145088 A1 | 9/2014 |
| WO | WO 2014/145104 A2 | 9/2014 |
| WO | WO 2014/145106 A1 | 9/2014 |

OTHER PUBLICATIONS

Ahmed Metwally, Christos Faloutsos, "V-SMART-Join: A Scalable MapReduce Framework for All-Pairs Similarity Joins of Multisets and Vectors", Journal Proceedings of the VLDB Endowment, vol. 5 Issue 8, Apr. 2012, pp. 704-715.*

Lars Kolb, Hanna Köpcke, Andreas Thor, Erhard Rahm, "Learning-based entity resolution with MapReduce", Proceeding CloudDB '11 Proceedings of the third international workshop on Cloud data management, Oct. 24, 2011, pp. 1-6.*

Qiaozhu Mei, Xuehua Shen, Chengxiang Zhai, "Automatic Labeling of Multinomial Topic Models", KDD '07 Proceedings of the 13th ACM SIGKDD international conference on Knowledge discovery and data mining, Aug. 12, 2007, pp. 490-499.*

Wilson Wong, Wei Liu, Mohammed Bennamoun, "Ontology Learning from Text: A Look Back and into the Future", ACM Computing Surveys (CSUR) Surveys, vol. 44 Issue 4, Article No. 20, Aug. 2012, pp. 20.1-20.36.*

Juan Ramos, "Using TF-IDF to Determine Word Relevance in Document Queries", The First Instructional Conference on Machine Learning (ICML-2003), proceedings of, Dec. 3, 2003, pp. 1-4.*

Kevin W. Boyack, David Newman, Russell J. Duhon, Richard Klavans, Michael Patek, Joseph R. Biberstine, Bob Schijvenaars, Andre Skupin, Nianli Ma, Katy Borner, "Clustering More than Two Million Biomedical Publications: Comparing the Accuracies of Nine Text-Based Similarity Approaches", PLos One, vol. 6, issue 3, e18029, Mar. 2011, pp. 1-11.*

Marti A. Hearst and Jan O. Pedersen, "Reexamining the Cluster Hypothesis: Scatter/Gather on Retrieval Results", SIGIR '96 Proceedings of the 19th annual international ACM SIGIR conference on Research and development in information retrieval , Aug. 18, 1996, pp. 76-84.*

Stanislaw Osinski and Dawid Weiss, "A Concept-driven Algorithm for Clustering Search Results", IEEE Intelligent Systems, vol. 20, Issue 3, Jun. 13, 2005, pp. 48-54.*

Breese, John S., David Heckerman, and Carl Kadie. "Empirical analysis of predictive algorithms for collaborative filtering." Proceedings of the Fourteenth conference on Uncertainty in artificial intelligence. Morgan Kaufmann Publishers Inc., 1998.*

Wang, Cong, et al. "Achieving usable and privacy-assured similarity search over outsourced cloud data." INFOCOM, 2012 Proceedings IEEE. IEEE, 2012.*

Anonymous, "SpatialPrefixTree (Lucene 4.0.0 API)," Mar. 13, 2013, 4 pages https://web.archive.org/web/20130313072002/http://lucene.apache.org/core/4_0_0/spatial/org/apache/lucene/spatial/prefix/tree/SpatialPrefixTree.html.

International Search Report and Written Opinion for International Application No. PCT/US2014/029724, dated Jul. 29, 2014, 12 pages.

(56) References Cited

OTHER PUBLICATIONS

International Search Report and Written Opinion issued by the International Searching Authority for International Application No. PCT/US2014/029787 dated Aug. 13, 2014 (9 pages).
Oosterom, V. P. et al., "The Spatial Location Code," Proceedings of the International Symposium on Spatial Datahandling, Aug. 12, 1996, 12 pages.
Samet, H. "Hierarchical Spatial Date Structures," University of Maryland, Jul. 17, 1989, pp. 193-212.
Smiley, "Lucene 4 spatial," Open Source Conference, Oct. 2, 2012, 16 pages.
Tian, M. et al., "Efficient algorithms for fast integration on large data sets from multiple sources," BMC Medical Informatics and Decision Making, vol. 12, No. 1, 6 pages (Jun. 28, 2012).
Varma, H. P. et al., "A Data Structure for Spatio-Temporal Databases," International Hydrographic Review, vol. 67, Issue 1, Jan. 1990, pp. 71-92.
Xuan Liu et al., "CDAS: A Crowdsourcing Data Analytics System", Proceedings of the VLDB Endowment, vol. 5. No. 10, pp. 1040-1051.
Supplementary European Search Report/Opinion EP14725817, dated Dec. 1, 2016, 6 pages.
International Search Report and Written Opinion issued by ISA Application No. PCT/US14/029787 dated Aug. 13, 2014, 9 pages.
Franklin, Michael J., et al. "CrowdDB: answering queries with crowdsourcing." Proceedings of the 2011 ACM SIGMOD.
International Preliminary Report on Patentability for International Application No. PCT/US14/029737 dated Sep. 15, 2015, 7 pages.
Smiley, D. "Lucene 4 Spatial," 2012 Basis Technology, Open Source Conference, Oct. 2, 2012, 16 pages.
International Preliminary Report and Written Opinion for International Application No. PCT/US14/029755 dated Aug. 27, 2014, 10 pages.
Communication pursuant to Rules 161(2) and 162 EPC for European Application No. 14720407.7-1854, dated Nov. 10, 2015, 2 pages.
Communication pursuant to Rules 161(2) and 162 EPC for European Application No. 14720841.7-1951, dated Oct. 30, 2015, 2 pages.
Communication pursuant to Rules 161(2) and 162 EPC for European Application No. 14727983.0-1951, dated Dec. 22, 2015, 2 pages.
Communication pursuant to Rules 161(2) and 162 EPC for European Application No. 14730242.6-1951, dated Oct. 30, 2015, 2 pages.
Communication pursuant to Rules 161(2) and 162 EPC for European Application No. 14725817.2-1951 dated Jan. 5, 2016, 2 pages.
Communication pursuant to Rules 161(2) and 162 EPC for European Application No. 14725818.0-1951, dated Oct. 30, 2015, 2 pages.
Response to Communication pursuant to Rules 161(2) and 162 EPC for European Application No. 14720407.7-1854, dated May 10, 2016, 3 pages.
Claims for Response to Communication pursuant to Rules 161(2) and 162 EPC for European Application No. 14720407.7-1854, dated May 10, 2016, 4 pages.
Response to Communication pursuant to Rules 161(2) and 162 EPC for European Application No. 14720841.7, dated Apr. 29, 2016, 2 pages.
Claims for Response to Communication pursuant to Rules 161(2) and 162 EPC for European Application No. 14720841.7, dated Apr. 29, 2016, 7 pages.
Specification for Response to Communication pursuant to Rules 161(2) and 162 EPC for European Application No. 14720841.7, dated Apr. 29, 2016, 2 pages.

European Search Report for European Application No. 14720841.7, dated Oct. 6, 2016, 7 pages.
European Search Report for European Application No. 14727983.0-1955, dated Dec. 8, 2016, 9 pages.
Response to Communication pursuant to Rules 161(2) and 162 EPC for European Application No. 14725817.2, dated Jul. 11, 2016, 2 pages.
Claims for Response to Communication pursuant to Rules 161(2) and 162 EPC for European Application No. 14725817.2, dated Jul. 11, 2016, 4 pages.
Claims and Response to Communication pursuant to Rules 161(2) and 162 EPC for European Application No. 14725818.0, dated Apr. 29, 2016, 9 pages.
Communication pursuant to Article 94(3) EPC for European Application No. 14730242.6, dated Nov. 14, 2016, 4 pages.
Claims and Response to Communication pursuant to Rules 161(2) and 162 EPC for European Application No. 14727983.0, dated Jun. 23, 2016, 10 pages.
Response to Communication pursuant to Article 94(3) EPC for European Application No. 14730242.6, dated Mar. 15, 2017, 12 pages.
Italiano, et al., "Synchronization Options for Data Warehouse Designs," Computer, IEEE Computer Society, Mar. 2006, pp. 53-57.
Search Report and Written Opinion for International Application No. PCT/US14/029787 dated Sep. 18, 2014, 7 pages.
International Preliminary Report on Patentability for International Application No. PCT/US14/029787 dated Sep. 15, 2015, 4 pages.
Search Report and Written Opinion for International Application No. PCT/US14/029713 dated Nov. 5, 2014, 7 pages.
Search Report and Written Opinion for International Application No. PCT/US14/029784 dated Dec. 17, 2014, 7 pages.
International Preliminary Report on Patentability for International Application No. PCT/US14/029784 dated Sep. 15, 2015, 6 pages.
Search Report and Written Opinion for International Application No. PCT/US14/029755 dated Sep. 18, 2014, 8 pages.
International Preliminary Report on Patentability for International Application No. PCT/US14/029755 dated Sep. 15, 2015, 5 pages.
International Preliminary Report on Patentability for International Application No. PCT/US14/029713 dated Sep. 15, 2015, 6 pages.
Search Report and Written Opinion for International Application No. PCT/US14/029737 dated Dec. 9, 2014, 8 pages.
EP Examination report EP14725817.2 dated Jul. 17, 2018.
Michael J Cafarella: "Extracting and Querying a Comprehensive Web Database", Jan. 1, 2009, pp. 1-7 XP055500317, URL:https://database.cs.wisc.edu/cidr/cidr.
Sebastian Hellmann et al.: "DBpedia Live Extraction", Nov. 1, 2009 (Nov. 1, 2009), On the Move to Meaningful Internet Systems: Otm 2009, Springer Berlin Heidelberg, Berlin, Heidelberg, pp. 1209-1223.
Anonymous: "Record linkage—Wikipedia", 1-15 Mar. 13, 2013 (Mar. 13, 2013), XP055500110, URL:https://en.wikipedia.org/w/index.php?title=Record_linkage&oldid=543842434.
Office Action,Chinese Patent Application No. 201480014828.0, with English \Translation, dated Jan. 2, 2019.
Andrei Tamilin et al, Context-aware Mobile Crowdsourcing, PN153073, UBICOMP, 12, pp. 1-4 Sep. 8, 2012.
EP Examination report EP18179405, dated Aug. 27, 2018, 9 pages.
"DAMA Data Management Knowledge System Guidelines", DAMAInternational, p. 226, Beijing: Tsinghua University Publishing House, Jul. 2012) cited in Office action of Application No. CN201480014861.3 with English Translation.
GEOHASH, Wikipedia, the :flee encyclopedia,Jun. 16, 2014, 6 pages http://en.wikipedia org/w/index.php?title=Geohash&oldid=52302473.

* cited by examiner

| Cluster 1 (uuid1) | Cluster 2 (uuid2) |
|---|---|
| A: McDonalds 123 Elm St Suite A<br>B: McDonald's Restaurant 123 Elm Street<br>C: Starbucks Coffee 123 Elm Street | D: Starbucks 123 Elm St Suite B<br>E: McDonalds 123 Elm St |

FIG. 7A

```
{"clusters": {"uuid1": [["uuid1","A","B"],["uuid2","E"]], "uuid2":
[["uuid1","C"],["uuid2","D"]...]},
"deprecate": {},
"create": [],
"delete": [],
"inputMeta": {"type": "SUPER_CLUSTER"}
}
```

FIG. 7B

| Distributed Pairs | Unioned Sets |
|---|---|
| A-B<br>B-C<br>C-D<br>A-D<br>C-E<br>F-G<br>G-H<br>I-J<br>J-K<br>I-K | ABCDE<br>FGH<br>IJK |

APPARATUS, SYSTEMS, AND METHODS FOR GROUPING DATA RECORDS

CROSS REFERENCE TO RELATED APPLICATIONS

This application claims benefit of the earlier filing date, under 35 U.S.C. § 119(e), of:

U.S. Provisional Application No. 61/799,986, filed on Mar. 15, 2013, entitled "SYSTEM FOR ANALYZING AND USING LOCATION BASED BEHAVIOR";

U.S. Provisional Application No. 61/800,036, filed on Mar. 15, 2013, entitled "GEOGRAPHIC LOCATION DESCRIPTOR AND LINKER";

U.S. Provisional Application No. 61/799,131, filed on Mar. 15, 2013, entitled "SYSTEM AND METHOD FOR CROWD SOURCING DOMAIN SPECIFIC INTELLIGENCE";

U.S. Provisional Application No. 61/799,846, filed Mar. 15, 2013, entitled "SYSTEM WITH BATCH AND REAL TIME DATA PROCESSING"; and U.S. Provisional Application No. 61/799,817, filed on Mar. 15, 2013, entitled "SYSTEM FOR ASSIGNING SCORES TO LOCATION ENTITIES".

This application is also related to:

U.S. patent application Ser. No. 14/214,208, filed on Mar. 14, 2014, entitled "APPARATUS, SYSTEMS, AND METHODS FOR ANALYZING MOVEMENTS OF TARGET ENTITIES";

U.S. patent application Ser. No. 14/214,296, filed Mar. 14, 2014, entitled "APPARATUS, SYSTEMS, AND METHODS FOR PROVIDING LOCATION INFORMATION";

U.S. patent application Ser. No. 14/214,213, filed on Mar. 14, 2014, entitled "APPARATUS, SYSTEMS, AND METHODS FOR CROWDSOURCING DOMAIN SPECIFIC INTELLIGENCE";

U.S. patent application Ser. No. 14/214,219, filed on Mar. 14, 2014, entitled "APPARATUS, SYSTEMS, AND METHODS FOR BATCH AND REALTIME DATA PROCESSING"; and U.S. patent application Ser. No. 14/214,309, filed on Mar. 14, 2014, entitled "APPARATUS, SYSTEMS. AND METHODS FOR ANALYZING CHARACTERISTICS OF ENTITIES OF INTEREST".

The entire content of each of the above-referenced applications (including both the provisional applications and the non-provisional applications) is herein incorporated by reference.

FIELD OF THE INVENTION

This disclosure generally relates to apparatus, systems, and methods for grouping data records associated with entities.

BACKGROUND

A large amount of information is created every day. Social networking sites and blogging sites receive millions of new postings every day, and new webpages are constantly being created to provide information about a person, a landmark, a business, or any other entities that people are interested in. Furthermore, the information is usually not available from a single repository, but is usually distributed across millions of repositories, often located around the world.

Because of the sheer volume and the distributed nature of information, it is difficult for people to consume information efficiently. To address this issue, data analytics systems can (1) gather the information using a crawler and (2) create a meaningful summary of the gathered information so that the information can be consumed easily. For example, data analytics systems would desirably gather all available data records associated a particular entity, such as Factual, and provide a meaningful summary of the data records so that a user can consume information about the particular entity easily.

Unfortunately, creating a meaningful summary of the gathered information is challenging because oftentimes, it is unclear whether two or more data records are associated with the same entity, related entities, or not related at all, particularly at a scale of billions of records. Therefore, there is a need for an effective mechanism to resolve whether two or more data records provide information about the same entity, related entities, or independent entities.

SUMMARY

In general, in an aspect, embodiments of the disclosed subject matter can include an apparatus. The apparatus includes a processor configured to run one or more modules stored in memory. The one or more modules are configured to identify at least one pair of data records for which to determine a similarity value, determine the similarity value for the at least one pair of data records based, at least in part, on a plurality of attributes associated with the at least one pair of data records, and associate the at least one pair of data records with one or more clusters, each associated with a unique entity, based on the similarity value for the at least one pair of data records.

In general, in an aspect, embodiments of the disclosed subject matter can include a method for clustering a plurality of data records into at least one cluster. The method includes identifying, at a candidate reduction module, residing in a computing device, at least one pair of the plurality of data records for which to determine a similarity value, determining, at a similarity computation module residing in the computing device, in communication with the candidate reduction module, the similarity value for the at least one pair based, at least in part, on a plurality of attributes associated with the at least one pair of data records, and associating, at a clustering computation module residing in the computing device, in communication with the similarity computation module, the at least one pair of data records with one or more clusters, each associated with a unique entity, based on the similarity value for the at least one pair of data records.

In general, in an aspect, embodiments of the disclosed subject matter can include a computer program product, tangibly embodied in a non-transitory computer-readable storage medium. The computer program product includes instructions operable to cause a data processing system to identify at least one pair of data records for which to determine a similarity value, determine the similarity value for the at least one pair of data records based, at least in part, on a plurality of attributes associated with the at least one pair of data records, and associate the at least one pair of data records with one or more clusters, each associated with a unique entity, based on the similarity value for the at least one pair of data records.

In general, in an aspect, embodiments of the disclosed subject matter can include a method for clustering a plurality of data records into at least one cluster. The method includes which to determine a similarity value, determining, at the one or more modules, the similarity value for the at least one pair based, at least in part, on a plurality of attributes associated with the at least one pair of data records, and associating, at the one or more modules, in communication with the similarity computation module, the at least one pair of data records with one or more clusters, each associated with a unique entity, based on the similarity value for the at least one pair of data records.

In any one of the embodiments disclosed herein, the apparatus, the method, or the computer program product can include modules, steps, or executable instructions for identifying one or more pairs of data records for which a similarity value need not be determined based on a predetermined set of attributes that are likely to be shared by related data records.

In any one of the embodiments disclosed herein, the apparatus, the method, or the computer program product can include modules, steps, or executable instructions for adjusting the predetermined set of attributes based on association of data records to clusters from a previous iteration.

In any one of the embodiments disclosed herein, the apparatus, the method, or the computer program product can include modules, steps, or executable instructions for determining the similarity value based on a similarity function learned from training data records.

In any one of the embodiments disclosed herein, the similarity function is designed to infer an importance of a particular component associated with a particular attribute of a data record, wherein the similarity function is learned by determining differences between components associated with the particular attribute of the training data records, wherein the training data records are known belong to the same cluster, and determining the importance of the particular component based on a number of times the particular component appears in the differences.

In any one of the embodiments disclosed herein, the similarity function is designed to infer a likelihood of interchanging a first component in a particular attribute of a data record with a second component, wherein the similarity function is learned by determining differences between components associated with the particular attribute of the training data records, wherein the training data records are known belong to the same cluster, and determining the likelihood of interchanging the first component with the second component based on a number of times the first component and the second component appears in the differences at the same time.

In any one of the embodiments disclosed herein, the similarity function is designed to determine a conditional likelihood that a missing attribute of a data record has a particular component, wherein the conditional likelihood is determined by determining a combination of known attributes corresponding to a particular entity, determining all variations of a missing attribute amongst data records of the particular entity having the combination of known attributes, and determining a conditional probability, based on the variations of the missing attribute, that the missing attribute has a particular component given that the data record has the particular combination of known attributes.

In any one of the embodiments disclosed herein, the apparatus, the method, or the computer program product can include modules, steps, or executable instructions for representing the plurality of data records as a plurality of nodes in a graph, represent the similarity value for the at least one pair of data records as at least one edge between nodes, in the graph, corresponding to the at least one pair of data records, and determine the one or more clusters from based on the graph.

In any one of the embodiments disclosed herein, the apparatus, the method, or the computer program product can include modules, steps, or executable instructions for determining the one or more clusters based on the graph using a graph clustering technique.

In any one of the embodiments disclosed herein, the apparatus, the method, or the computer program product can include modules, steps, or executable instructions for receiving a clustering directive requiring the one or more modules to associate two data records with the same cluster.

In any one of the embodiments disclosed herein, the apparatus, the method, or the computer program product can include modules, steps, or executable instructions for associating at least one of the plurality of data records to one or more clusters using a clustering technique, and adjusting a parameter for the clustering technique for each of the one or more clusters independently, based on data records in the one or more clusters.

In any one of the embodiments disclosed herein, the apparatus, the method, or the computer program product can include modules, steps, or executable instructions for determining the similarity value for the at least one pair of data records by receiving the similarity value for the at least one pair of data records from another computing device.

In any one of the embodiments disclosed herein, the apparatus, the method, or the computer program product can include modules, steps, or executable instructions for receiving, from a plurality of computing devices, a plurality of sub-clusters independently identified at the plurality of computing devices, and performing a union-find operation on the plurality of sub-clusters to identify the one or more clusters.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIGS. 7A-7B illustrates a process of applying a clustering directive to a set of clusters in accordance with some embodiments.

FIG. 9 illustrates a union-find operation to merge pairs of data records into clusters in accordance with some embodiments.

DETAILED DESCRIPTIONS

Figure 1:
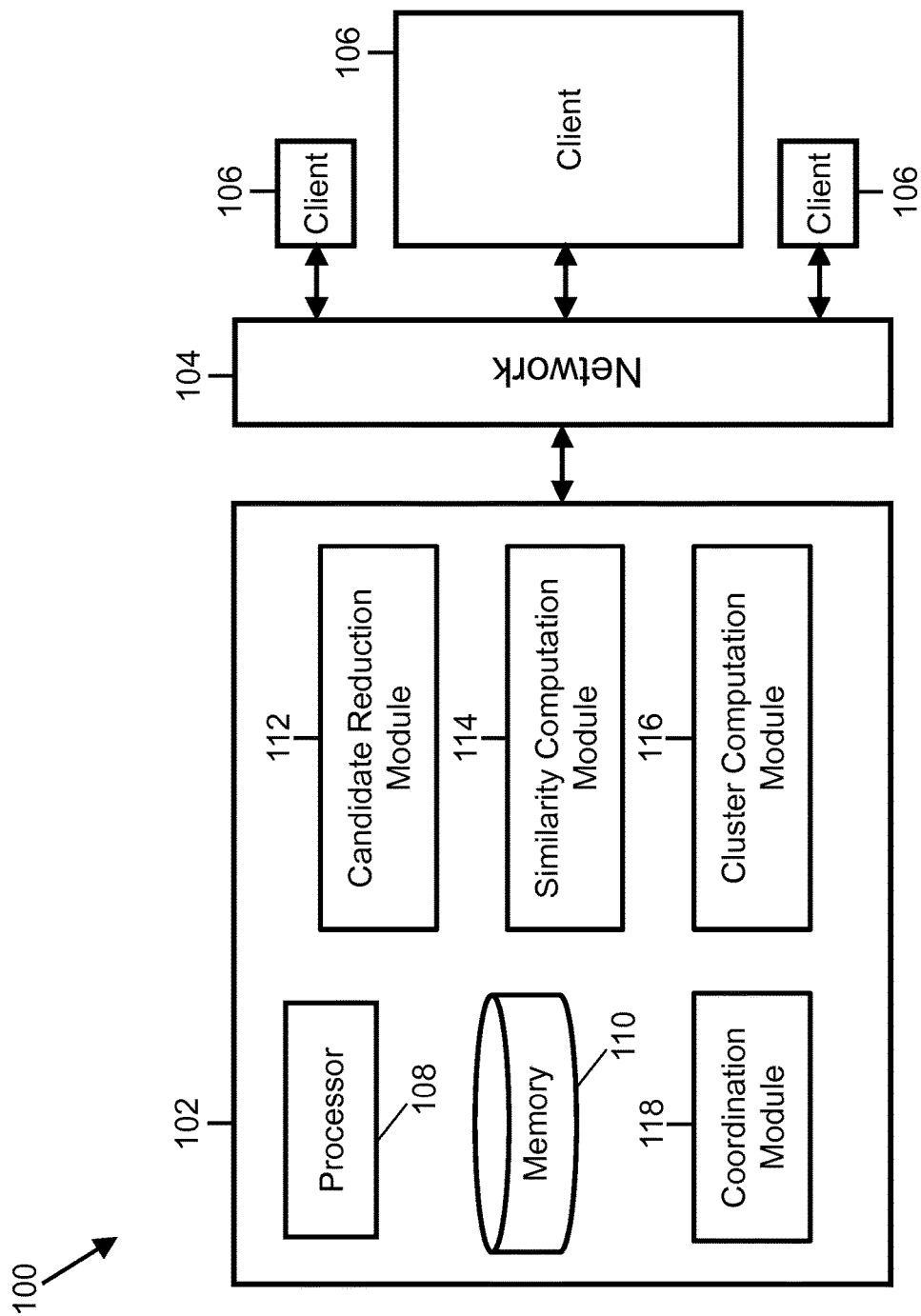
FIG. 1 illustrates a diagram of a location query system in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

A data record can be used to describe any type of entity (e.g., a physical object, a virtual object, a living object, a man-made object) to which information can be associated. Each data record can be associated with a data record identifier that uniquely identifies the corresponding data record. In some embodiments, a data record can include a set of attributes, each attribute designed to convey information about a particular aspect of an entity. For example, a data record can include an attribute "type of entity," and the value of the attribute can be "restaurant." The data record can also include an attribute "name," and the value of the attribute can be "Le Bernardin." The data record can also include an attribute "a number of years in business," and the value of the attribute can be "42." In some embodiments, the set of attributes associated with a data record can depend on the type of the entity. For example, when a data record is associated with a corporation, the data record can include an attribute "the year of incorporation."

Oftentimes, a single entity can be referenced by a large number of data records, and these data records may provide different types of information about the particular entity. In order to consolidate information from the data records, to summarize facts and opinions about the entity based on the data records, and/or to determine the relationships between the data records referencing the particular entity, it is generally desirable to group data records based on the entity or entities referenced by the data records.

Such grouping of data records can be a simple task if each of the data records unambiguously identified a particular entity it was referring to. Unfortunately, a data record often fails to include a unique attribute of an entity, such as an address of a restaurant, which would unambiguously indicate that the data record references a particular entity. Furthermore, even if the data record did include a unique attribute, the format of the unique attribute may be different depending on, for example, who generated the data record. Because there is no control mechanism to encourage data sources, such as bloggers, to use complete, formatted, and unambiguous attributes when referring to an entity, data records referring to the same entity may only have partially similar (e.g., overlapping) attributes, which can limit the confidence that the data records refer to the same entity.

For example, several web pages may reference a restaurant called "The French Laundry". Some may misspell the name of the restaurant, for instance, "The French Luandry," while others may refer to the restaurant as "French Laundry Restaurant". It is, thus, desirable to be able to infer that these web pages all refer to the same restaurant by, for example, analyzing the similarities in the name of the referenced restaurant and analyzing other information in the web pages. On the other hand, when several web pages refer to "Starbucks in Los Angeles on Santa Monica Blvd", it is desirable to be able to infer that the web pages may be referring to different Starbucks entities since Santa Monica Blvd may host several Starbucks entities.

The present application relates to apparatus, systems, and methods for grouping data records based on entities referenced by the data records. The disclosed grouping mechanism can include determining a pair-wise similarity between a large number of data records, and clustering a subset of the data records based on their pair-wise similarity. In some cases, data records that belong to the same cluster can refer to similar entities. In other cases, data records that belong to the same cluster can refer to the same entity.

Clustering two or more data records can include determining a similarity between two or more data records, and grouping the two or more data records into a single cluster when the two or more data records are sufficiently similar. The clustering data records efficiently can be challenging for at least three reasons. Firstly, the clustering mechanism uses a similarity function to determine a similarity between two data records. However, it is challenging to determine a robust similarity function that can adequately determine a similarity between two data records across a wide variety of data records. For example, when two data records are associated with "The French Laundry" and "The French Luandry," respectively, it is difficult for the similarity function to understand that the two data records refer to the same entity because one of the names includes a typo. While a programmer can hand-tune the similarity function to take into account all possible scenarios in which two data records may be similar, this can be an extremely challenging task given the number of data records and the number of ways in which the variations can be manifested.

Secondly, the clustering mechanism also involves determining how similar two data records should be in order to be clustered together. For example, when two data records are associated with "The French Laundry" and "The French Luandry," respectively, and the similarity value, computed by the similarity function, is 0.9, the clustering mechanism may want to cluster the two data records, but when two data records are associated with "The French Laundry" and "The Lanudry French," respectively, and the similarity value, computed by the similarity function, is 0.5, the clustering mechanism may not want to cluster the two data records. Therefore, the clustering involves a challenging task of determining when to cluster two data records given the similarity.

Thirdly, the clustering mechanism potentially involves determining similarities between every pair of data records in a dataset. Unfortunately, the dataset can include billions of data records representing different entities, and it is computationally challenging to compute similarities between every pair of billions of data records. For example, computing a similarity among one billion ($1 \times 10^9$) records entails performing about $10^{18}$ similarity computation. If each similarity computation takes about 1 ms, $10^{18}$ comparisons would take approximately 15 thousand years on 500 computers with 4 processing cores each.

The disclosed grouping mechanism addresses these challenges of a clustering mechanism by (1) automatically learning a similarity function for the clustering mechanism by analyzing data records in a dataset, (2) providing enforcement mechanisms to improve the clustering of data records, and (3) pruning data record pairs for which to compute similarities.

The disclosed grouping mechanism support using custom domain-specific rules to enable appropriate comparisons among entities of various types, the capability to distribute work to many networked computers and appropriately combine the results of distributed computations, and strategies to derive contextual probability that enables comparison of entity references with incomplete or only partially overlapping attributes. The disclosed grouping mechanism may also enable clustering directives and hints to force or encourage certain clustering outcomes.

In some embodiments, the disclosed grouping mechanism can infer how attributes relate to a particular entity type or can determine relative similarity of entities based on domain specific rules associated with a particular entity type. For example, when comparing toothpaste products, it is desirable that the data grouping mechanism can determine the name of the brand across with brand synonyms and alternate spellings, determine a size of the product on a common unit (e.g., milliliters) when data records represent the size of products in a variety of units, and determine that flavor may have the most impact on determining similarity among toothpaste products. On the other hand, when comparing doctors, it is desirable that the data grouping mechanism can determine that, instead of flavor, specialty, medical school, and the number of years in practice may have the most impact on determining similarities among doctors.

In some embodiments, the disclosed grouping mechanism can complete the data grouping process on many billions of data records within a reasonable amount of time. To this end, the disclosed grouping mechanism can be deployed on a distributed computing system with many computation platforms. Also, the disclosed grouping mechanism is designed to avoid doing unnecessary work such as doing computationally expensive operations on data records that are unlikely to be associated with the same entity. For example, when two data records are associated with an entity in different countries, it is unlikely that two data records could refer to the same entity. Therefore, the disclosed grouping mechanism can decide not to compare the two data records.

FIG. 1 illustrates a diagram of a location query system in accordance with some embodiments. The system 100 includes a host server 102, a communication network 104, and one or more client devices 106.

The host server 102 can include a processor 108, a memory device 110, a candidate reduction (CR) module 112, and a similarity computation module 114. The host server 102 and the one or more client devices 106 can communicate via the communication network 104. Although FIG. 1 represents the host server 102 as a single server, the host server 102 can include more than one server. In some embodiments, the host server 102 can be part of a cloud-computing platform. The host server 102 on the cloud-computing platform can be managed using a management system. In some embodiments, the host server 102 can reside in a data center. In some embodiments, the host server 102 can operate using an operating system (OS) software. In some embodiments, the OS software is based on a Linux software kernel and runs specific applications in the server such as monitoring tasks and providing protocol stacks.

The processor 108 of the host server 102 can be implemented in hardware. The processor 108 can include an application specific integrated circuit (ASIC), programmable logic array (PLA), digital signal processor (DSP), field programmable gate array (FPGA), or any other integrated circuit. The processor 108 can also include one or more of any other applicable processors, such as a system-on-a-chip that combines one or more of a CPU, an application processor, and flash memory, or a reduced instruction set computing (RISC) processor. The memory device 110 coupled to the processor 108 can include a computer readable medium, flash memory, a magnetic disk drive, an optical drive, a programmable read-only memory (PROM), a read-only memory (ROM), or any other type of device that is capable of at least temporarily retaining data including, for example, a bit value.

The candidate reduction (CR) module 112 is configured to receive a pair of data records and determine whether the pair of data records is likely to belong to the same cluster. If the pair of data records is likely to belong to the same cluster, the CR module 112 indicates that the pair of data records is eligible for further processing, and provides the pair of data records to the similarity computation module 114, indicating that the pair of data records is a candidate for the similarity computation. If the pair of data records is unlikely to belong to the same cluster, the CR module 112 can indicate that the pair of data records is not eligible for further processing and discard the pair of data records from further processing.

In some embodiments, the CR module 112 can operate in a batch mode. In the batch mode, the CR module 112 can receive and process a number of pairs of data records before providing a subset of the processed pairs to the similarity computation module 114. In other embodiments, the CR module 112 can operate in a streaming mode. In the streaming mode, the CR module 112 can process one pair of data records, and provide the pair of data records to the similarity computation module 114, if applicable, before processing a new pair of data records.

The similarity computation (SC) module 114 is configured to receive a pair of data records from the CR module 112 and determine a similarity between the pair of data records. The SC module 114 can determine the similarity between the pair of data records based on a similarity function. The SC module 114 can learn the similarity function using a supervised learning technique. The SC module 114 can learn the similarity function based on a non-supervised learning technique.

In some embodiments, the similarity function can take into account, at least in part, a similarity of attributes in data records being compared. For example, when the similarity function determines a similarity between two data records associated with the entity type "restaurants," the similarity function can take into account, at least in part, the similarity of attributes associated with the data records, such as "name", "location", "average price", "popularity," and/or "years in operation." In some cases, the similarity of the attributes can be weighed equally to determine the similarity value between a pair of data records. In other cases, the similarity of the attributes can be weighted differently based on an importance of that attribute in the data record.

In some embodiments, the SC module 114 can automatically determine an importance of an attribute in a data record when computing the similarity between a pair of data records. For example, when comparing data records corresponding to the entity type "person," the SC module 114 can associate a high importance to the attribute "interested sports."

In some cases, the SC module 114 can associate a different importance to the same attribute in two different data records when the two data records are associated with different entity types. For example, when comparing data records corresponding to the entity type "doctor", the SC module 114 can associate a high importance to the attribute "school" from which the doctors received their degree. On the other hand, when comparing data records corresponding to the entity type "baseball player", the SC module 114 can associate a small importance to the attribute "school" from which the baseball players received their degree.

In some embodiments, the SC module 114 is configured to canonicalize values associated with certain attributes. For example, when a data record is associated with an entity type "toothpaste", and the data record includes an attribute "volume" and has a value in the unit "oz", then the SC module 114 can canonicalize the value so that the value has a unit "milliliters." This way, all data records associated with the entity type "toothpaste" has its volume represented in milliliters, which facilitates comparisons of the data records associated with the entity type "toothpaste".

The cluster computation (CC) module 116 is configured to receive similarity values for pairs of data records, and determine, based on the similarity values, whether to place one or more pairs of data records in the same cluster. In some embodiments, the CC module 116 can use a graph clustering technique to cluster data records based on pairwise similarity values. In some cases, the CC module 116 can use a different clustering parameter for each tentative cluster based on the types of data records tentatively included in that cluster. In some cases, the CC module 116 can receive a clustering directive, requiring the CC module 116 to associate two or more data records with the same cluster.

In some embodiments, once the CC module 116 provides a list of clusters, the CR module 112 can optionally be configured to re-visit the data records and identify additional pairs of data records, initially identified as ineligible for further processing, that are eligible for further processing based on the list of cluster. This operation can effectively expand the set of pairs of data records for which the cluster operation is performed.

Operations of the CR module 112, the SC module 114, and the CC module 116 can be coordinated by the coordination module 118. More particularly, the coordination module 118 is configured to coordinate the data transfer between the CR module 112, the SC module 114, and the CC module 116. For example, the coordination module 118 can cause the CR module 112 to identify pairs of data records for which the similarity should be computed and provide the pairs of data records to the SC module 114. Then the coordination module 118 can cause the SC module 114 to compute similarities between pairs of data records received by the SC module 114. Once the SC module 114 computes similarities, the coordination module 118 can cause the CC module 116 to identify clusters and their constituent data records based on the similarities.

In some embodiments, the coordination module 118 can be configured to distribute the processing of data records across multiple computing devices. For example, the coordination module 118 can be configured to distribute the candidate reduction operations across CR modules in other computing devices, for example, a plurality of data servers; the coordination module 118 can be configured to distribute the similarity computation operations across SC modules in other computing devices, for example, a plurality of data servers; and/or the coordination module 118 can be configured to distribute the cluster computation operations across CC modules in other computing devices, for example, a plurality of data servers. In some embodiments, the coordination module 118 can distribute operations and data across multiple computing devices using one or more of work distribution mechanisms, including, for example, a sharding scheme, a hashing scheme, a queue, and/or MapReduce. In some embodiments, the functionality of the coordination module 118 can itself be distributed across a plurality of computing devices. For example, the coordination module 118 can include a plurality of modules that are equipped with at least a part of the functionalities associated with the coordination module 118. The plurality of modules comprising the coordination module 118 can operate concurrently, and can take on a variety of forms depending on, for instance, whether the coordination module 118 is operating in a batch mode, a real-time mode, or any other modes of operation.

In some embodiments, the coordination module 118 can cause the CR module 112, SC module 114, and the CC module 116 to operate in a batch mode. In the batch mode, the coordination module 118 can cause the CR module 112, the SC module 114, and the CC module 116 to group data records without regards to a newly received data record. In contrast, the coordination module 118 can cause the CR module 112, SC module 114, and the CC module 116 to operate in a real-time mode. In the real-time mode, the coordination module 118 can cause the CR module 112, the SC module 114, and the CC module 116 to take into account a newly received data record and group the newly received data record along with the existing data records. For example, the coordination module 118 can operate as a web server and coordinate the CR module 112, the SC module 114, and the CC module 116 to assign a newly received data record to one of the clusters generated in the previous iteration of batch processing based on the existing data records.

In some embodiments, the CR module 112, the SC module 114, the CC module 116, and the coordination module 118 can be implemented in software stored in the memory device 110. The software stored in the memory device 110 can run on the processor 108 capable of executing computer instructions or computer code.

In some embodiments, the CR module 112, the SC module 114, the CC module 116, and the coordination module 118 can be implemented in hardware using an ASIC, PLA, DSP, FPGA, or any other integrated circuit. In some embodiments, the CR module 112, the SC module 114, the CC module 116, and the coordination module 118 can both be implemented on the same integrated circuit, such as ASIC, PLA, DSP, or FPGA, thereby forming a system on chip.

The communication network 104 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. Although FIG. 1 represents the network 104 as a single network, the network 104 can include multiple interconnected networks listed above.

A client 106 can include any platform capable of computations and communication. The client 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory.

The client 106 can also provide a variety of user interfaces such as a keyboard, a touch screen, a trackball, a touch pad, and/or a mouse. The client 106 may also include speakers and a display device in some embodiments.

A client 106 can include a desktop computer, a mobile computer, a tablet computer, a cellular device, netbooks, laptops, servers, and/or any equipment with computation capabilities or any other computing devices having a processor and memory. The client 106 can communicate with the host server 102 via the communication network 104. A communication module on a client 106 can be capable of migrating from one server to another server seamlessly, without causing program faults or system breakdown.

In some embodiments, the client 106 can include user equipment of a cellular network. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

Figure 2:
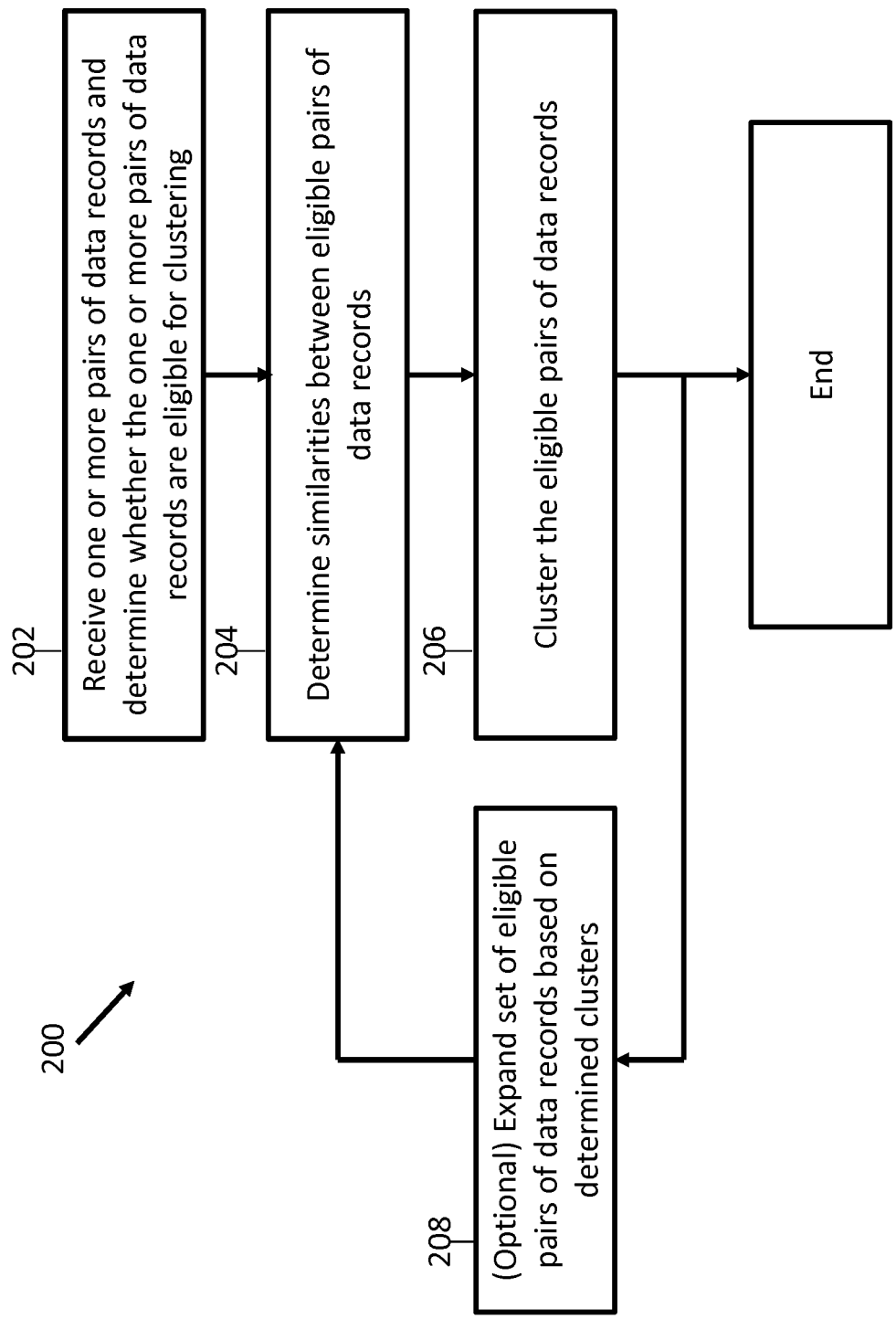
FIG. 2 illustrates a process of clustering data records in accordance with some embodiments.

FIG. 2 illustrates a process of clustering data records in accordance with some embodiments. The process 200 is exemplary and may be altered, e.g., by having steps added, removed, or rearranged.

In step 202, the CR module 112 is configured to receive one or more pairs of data records and determine whether the one or more pairs of data records are eligible for clustering. For example, the CR module 112 is configured to determine a likelihood that the one or more pairs of data records can be clustered into a cluster by analyzing a set of attributes included in the one or more of data records. When the CR module 112 determines that the one or more pairs of data records can be clustered into a cluster, the CR module 112 can indicate that the one or more pairs of data records are eligible for further processing and provide the one or more pairs of data records to the SC module 114. When the CR module 112 determines that the one or more pairs of data records would unlikely be clustered into a cluster, the CR module 112 can indicate that the one or more pairs of data records are ineligible for further processing and discard the one or more pairs of data records from further processing.

In some embodiments, the CR module 112 can determine the eligibility of a pair of data records by bucketing data records. In particular, the CR module 112 can be configured to bucket data records based on a predetermined set of attributes, referred to as a bucket type, that are likely to be shared by related data records and that are unlikely to be shared by unrelated data records. For example, when two data records have an entity type of "restaurant," then they are likely to be clustered together if the name attribute of the two data records are similar. Therefore, the CR module 112 can compare the name attribute of the two data records to determine whether the two data records are eligible for the full similarity computation. In some embodiments, the bucket type can be different for different entity types. For example, for restaurant entities, the CR module 112 can use a concatenation of the name attribute and the postcode attribute as one bucket type, and a concatenation of the phone number and the approximate location (e.g., a latitude/longitude coordinate) as a second bucket type. Though such bucketing, the CR module 112 can quickly identify a pair of data records that may refer to the same entity, which are eligible for further processing, and a pair of data records that may not refer to the same entity, which are ineligible for (e.g., excluded from) further processing.

In some embodiments, the CR module 112 can be configured to quickly compare bucket types in data records using a hashing technique. For example, the CR module 112 is configured to convert values of bucket types into hashes (e.g., a set of bits), and is configured to determine that data records whose hashes have more bits in common are more likely to be eligible for further processing. The hashing technique can include any hashing technique that can estimate a similarity between two attributes, such as simhash or minhash.

In some embodiments, the CR module 112 can be configured to reduce redundant similarity computation. In particular, the CR module 112 can be configured to remove redundant symmetric pairs of data records, thereby ensuring that the SC module 114 receives only unique pairs of data records. For example, when the CR module 112 receives two pairs of data records (A, B) and (B, A), the CR module 112 can be configured to discard one of the two pairs from further processing. To this end, the CR module 112 can be configured to sort the order of data records within the pair by, for example, the data record identifier, so that (B, A) is always represented as (A, B).

In step 204, the SC module 114 can receive eligible pairs of data records and determine similarities between the eligible pairs of data records. The similarities can be determined by analyzing a similarity of attributes associated with the data records. For example, when two data records are both associated with an entity type "restaurant" and the name associated with the two data records are "Massa" and "Masa", then the similarity between the two data records can be high. In contrast, when one of the pair of data records is associated with an entity type "restaurant" and the other data record is associated with an entity type "airplane," then the similarity between the two data records can be low.

The SC module 114 can use a similarity function to determine a similarity value between a pair of data records. A similarity function can include a plurality of sub-functions that produce scores and other features for each attribute and optionally a composite similarity score. The sub-function may include one or more operations per attribute with custom logic for specific entity types. In some embodiments, the sub-function may include simple string similarity computation functions, such as a Levenshtein distance computation function. In some embodiments, the sub-function may include an acronym aware function that is designed to compare the first letter of values associated with attributes. In some embodiments, the sub-function may include a distance function for computing a difference in the latitude and longitude data. These sub-functions can be adapted based on the attributes to which the sub-functions are applied.

The SC module 114 may store the similarity value for subsequent processing or provide the similarity value to the CC module 116. A similarity value can include data record identifiers of the two compared data records, at least one similarity score representing the similarity of the two data records, and, optionally, additional attributes such as one or more of: a repulsion score, similarity of each attribute in the data record, match features, as well as any additional data that may provide context for further clustering decisions.

Figure 3:
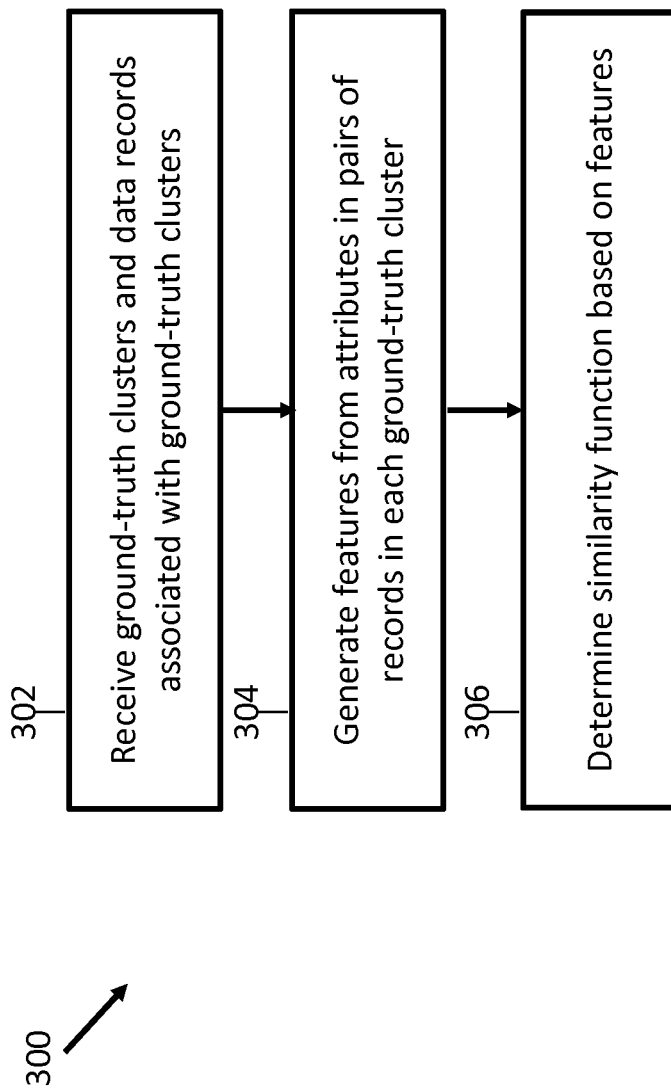
FIG. 3 shows a process of learning a similarity function in accordance with some embodiments.

In some embodiments, the SC module 114 can learn the similarity function using a machine learning technique. In particular, the SC module 114 can learn the similarity function using a supervised learning technique. FIG. 3 shows a process of learning a similarity function using a supervised learning technique in accordance with some embodiments. The process 300 is exemplary and may be altered, e.g., by having steps added, removed, or rearranged.

In step 302, the SC module 114 can receive a set of ground-truth clusters and data records associated with the ground-truth clusters. A ground truth cluster can be associated with a single entity or a set of related entities, and can include at least one data record associated with the single entity or the set of related entities. The ground-truth clusters can be created manually. For example, the ground-truth clusters can be generated by human annotators. For the purpose of this illustration, a ground-truth cluster can include the following data records, each data recording having two attributes: [name; address]:

[McDonald's Restaurant; 123 Elm street]
[McDonalds; 123 Elm st]
[Mcdonalds; 123 elm Street]
[Starbucks Coffee; 123 Elm]
[Starbucks; 123 elm St]

In some embodiments, the values in the attributes can be transformed into lowercase in order to reduce formatting variance. Therefore, the ground-truth cluster can include the following data records:

[mcdonald's restaurant; 123 elm street]
[mcdonalds;123 elm st]
[mcdonalds; 123 elm street]
[starbucks coffee; 123 elm]
[starbucks; 123 elm st]

In some embodiments, the values in the attributes can also be canonicalized to further reduce formatting variance. The canonicalization can include removing commas, dashes, hyphens, acronyms, domain-specific conventions, abbreviations, or any other formalities or informalities associated with referring to a name or a characteristic. Therefore, the ground-truth cluster from the above example can include the following data records:

[mcdonalds restaurant; 123 elm street]
[mcdonalds;123 elm street]
[mcdonalds; 123 elm street]
[starbucks coffee; 123 elm]
[starbucks; 123 elm street]

In step 304, the SC module 114 can retrieve attributes from the data records in each ground-truth cluster and generate features from the retrieved attributes based on pairwise comparisons of the retrieved attributes. A feature can indicate a component (e.g., a value) of an attribute that is shared by the pair of data records in the ground-truth data set. Therefore, when two, previously unseen data records share one of the determined features, the SC module 114 can determine that the two data records can have high similarity.

In some embodiments, a feature can be represented using two fields: [attribute, component]. The attribute field in the feature indicates the attribute from which the feature is generated, and the component field of the feature indicates the associated value of the attribute from which the feature is generated. Continuing with the example provided above, features generated from the ground-truth cluster can be as follows:

name: mcdonald
name: starbucks
address: elm
address: 123
address: street
physical_distance_meters_range: 0_to_25

The distance feature ("physical_distance_meters_range") can be computed by referring to a map and using the address associated with the data record to determine a distance between entities associated with the pair of data records.

In step 306, the SC module 114 can be configured to create a similarity function that can determine similarities between data records based on the features determined in step 304. In particular, the SC module 114 can use a supervised learning technique to learn a model that maps the features of step 304 to a similarity value. The ground-truth data for the supervised learning, which includes the relationship between the features of step 304 and the similarity value can be hand-labeled manually. The mapping can be modeled using linear regression, kernel regression, non-parametric regression, random forest, graphical model, or any other statistical model that can map the features of step 304 to a similarity value.

Once the SC module 114 determines the similarity function as outlined in process 300, the SC module 114 can use the similarity function to determine a similarity value for a previously unseen, input pair of data records. For example, the SC module 114 can be configured to determine one or more input features based on the input pair of data records, as discussed in step 304, and use the similarity function to map the one or more input features to a similarity value.

The disclosed clustering mechanism is designed to compare and cluster data records that reference different types of entities. For example, data records can reference one or more of restaurants, doctors, consumer packaged goods, smartphone apps, and video games. In addition, each of the entity types can have references in multiple languages or have multiple logical groupings, such as points of interest in the United States and points of interest in China, which are subject to both different rules and different languages.

Each kind of entity and each language can be subject to different rules regarding the importance of each attribute or groups of attributes and the importance of certain values or portions of values contained in those attributes. As an example, the tokens "Inc., Corporation, Incorporated, The" are not very distinguishing in the name of a business, such that when comparing "3M" and "The 3M Corporation" and "3M Inc.", they should not be considered as important differences.

Figure 4:
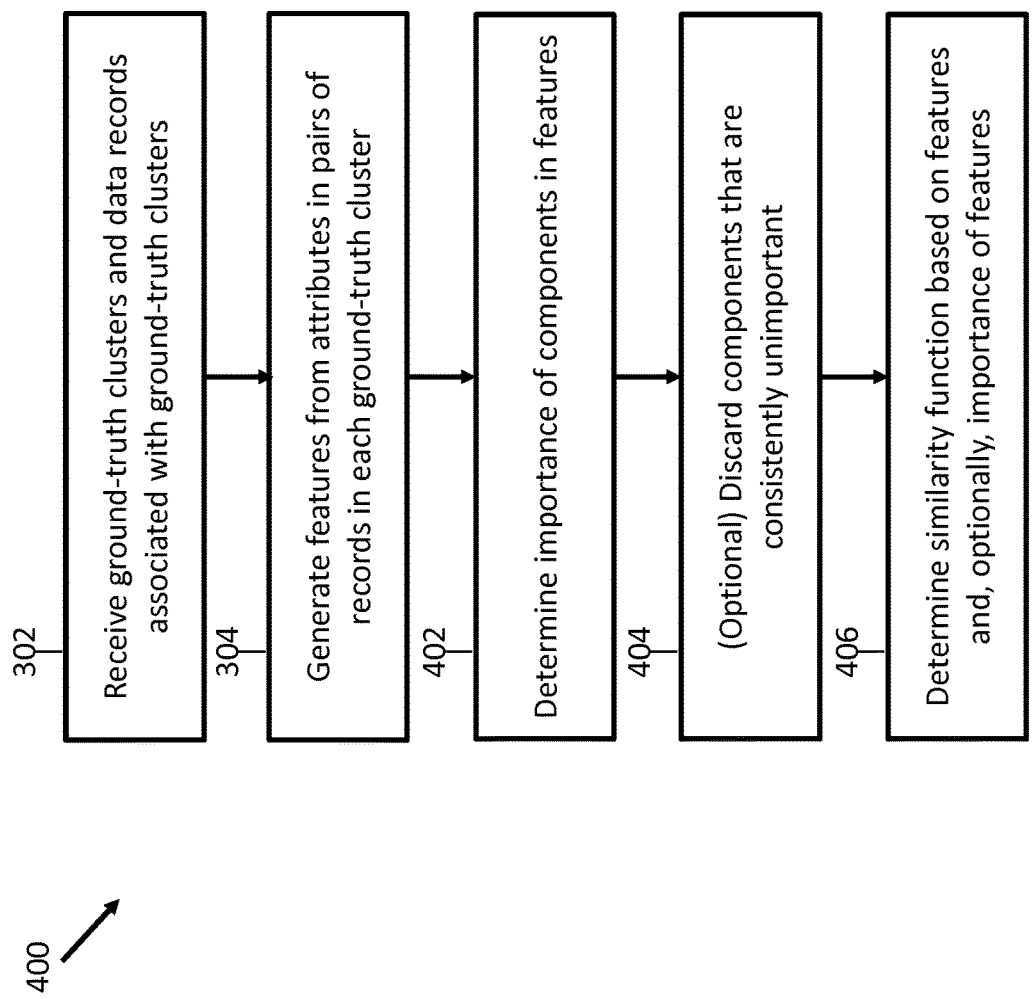
FIG. 4 illustrates a process of learning a similarity function based on importance of features in accordance with some embodiments.

To account for varying importance of words and features, the SC module 114 can be configured to determine an importance of features determined in step 304, and weigh the features based on the associated importance when determining the similarity function in step 306. FIG. 4 illustrates a similarity function determination process based on the importance of features in accordance with some embodiments. Once the features are generated in step 304, in step 402, the SC module 114 can determine weights for the features based on the importance associated with the features. In step 404, the SC module 114 can optionally discard features that are consistently unimportant. Then, in step 406, the SC module 114 can determine a similarity function based on the features and the importance associated with the features. In step 406, in some embodiments, the SC module 114 can use a supervised learning technique to map the features of step 304 and, optionally, the importance of features of step 402, to a similarity value. The ground-truth data for the supervised learning, which includes the relationship between the features of step 304, (optionally) the importance of features of step 402, and a corresponding similarity value can be hand-labeled manually. The mapping can be modeled using linear regression, kernel regression, non-parametric regression, random forest, graphical model, or any other statistical model that can map the features of step 304 and the importance of features of step 402 to a similarity value.

In step 402, in some embodiments, the SC module 114 can determine the importance of components in features by receiving a quantification of importance of various features (e.g., components of an attribute) as labeled by humans. For example, the SC module 114 can receive, as a configuration file or as a user command, a table that associates a feature with an importance. Referring to the above example, the SC module 114 can receive a configuration file, indicating that the "name: starbucks" is the most important feature for this cluster and "address: street" is the least important feature for this cluster.

In other embodiments, the SC module 114 can automatically determine an importance of a feature based on, for example, an unsupervised learning technique. The SC module 114 can receive data records that have small differences between them. This allows the SC module 114 to unambiguously group the data records into the same cluster, but at the same time discern differences that are not important for grouping into the same cluster. As an output of the unsupervised training, the SC module 114 can provide, as a model, a frequency of how often a token can be excluded without changing meaning of an entity (e.g., the cluster to which the entity belongs to) relative to how often it appears and a frequency for when a token can be exchanged with another without changing meaning.

More particularly, the SC module 114 may go through all of the data records for a particular entity type and identify data records that unambiguously belong to the same cluster (e.g., the same entity). Once the SC module 114 has determined that data records are associated with the same cluster, the SC module 114 is configured to determine differences of components between two data records belonging to the same cluster. The differences of components between two data records can include components that appear in only one of the two data records. If a component only appears in one of the two data records that belong to the same cluster, it indicates that the component is not critical in associating the two data records to the same cluster. Therefore, that component can be given a lower importance score. This process can be repeated across a large number of data records to generate a stable importance score for components. Any features that include low-importance components can be associated with a low importance score as well.

Figure 5:
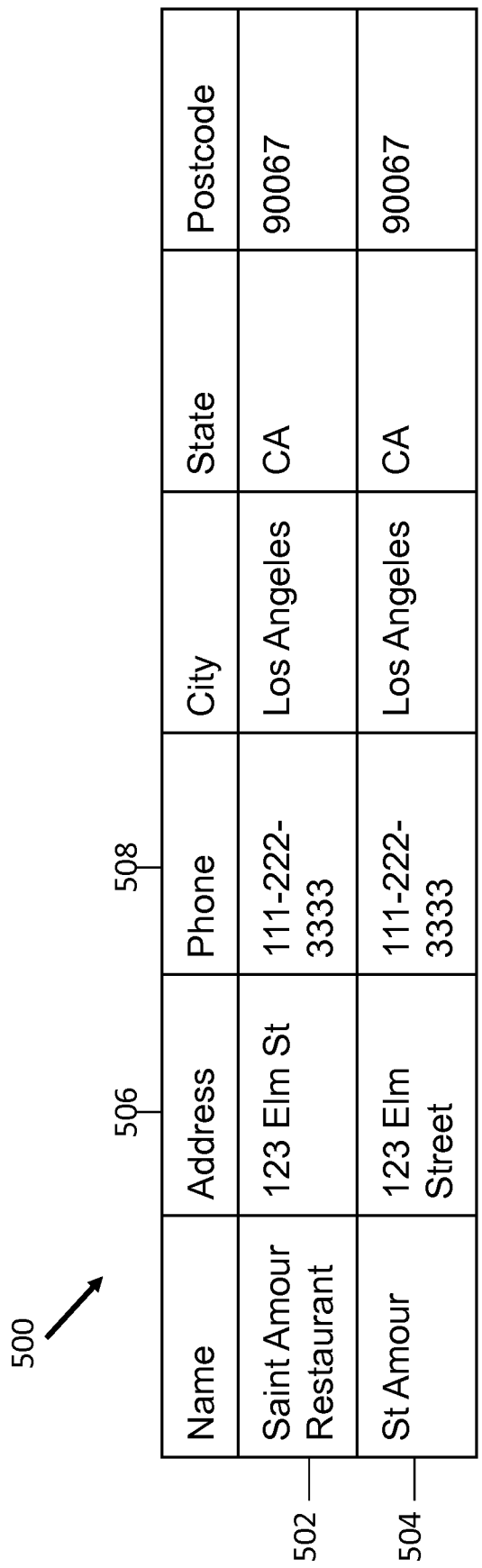
FIG. 5 illustrates a set of data records belonging to the same cluster in accordance with some embodiments.

For example, consider a set of data records illustrated in FIG. 5 in accordance with some embodiments. The two data records 502, 504 are determined to be associated with the same cluster based on the high similarity of components in the address attribute 506 and the phone number attribute 508. Once the SC module 114 has determined that the data records 502, 504 are associated with the same cluster, the SC module 114 is configured to determine differences of components in attributes associated with the pair of data records 502, 504 in the same cluster. In FIG. 5, the differences between components in the name attribute are "Saint", "St", and "Restaurant." The SC module 114 can maintain the number of times such differences occur across a large set of data records corresponding to the same cluster. If a component is identified as a difference many times, then the SC module 114 can determine that the importance of that component is low, and the importance of features associated with that component is also low. In this example, the component "Restaurant" in the name attribute of the data record 502 is given a low importance for the name attribute because the other data record 504 of the same cluster does not use the term "Restaurant" in the name attribute. In some embodiments, the SC module 114 can compute separate importance scores for each attribute independently.

Such an unsupervised learning technique can enable the SC module 114 to automatically produce rules for computing the importance scores for features, even if the data records correspond to different entity types and use new languages. This approach can significantly reduce the burden of manual configurations or requirement of domain expertise. For example, when the SC module 114 is configured to determine an importance score for features associated with points of interest, the SC module 114 may automatically determine that in Italy, "SPA", "SRL", and "Ristorante" are relatively unimportant when used at the end of a business name in the same way that "LLC", "Inc", and "Restaurant" are relatively unimportant in the United States. Such information can be automatically gathered without any domain specific knowledge, for example, that "SPA" is a form of limited liability company in Italy, nor language knowledge, including that "Ristorante" means "Restaurant". As another example, the SC module 114 can learn that "Inc" is not important because there are examples of "3M Inc" and "3M" with identical addresses and phone numbers. In this case, "Inc" appears to be unimportant and sometimes optional in the data and thus a signal that it can be excluded or given a relatively lower importance score than components that are not unimportant (i.e. have relatively fewer examples of being optional) when comparing entities.

Interchangeability of components can also be important for determining a similarity between data records. For example, "Chipotle Mexican Grill" should be considered more similar to "Chipotle Restaurant" than "Rubios Fresh Mexican Grill", because "Mexican Grill" are sometimes interchangeable with "Restaurant" while terms like "Chipotle" and "Rubios" are not interchangeable. As another example, "Inc" is interchangeable with "Incorporated" and "Corp" and "Corporation". The SC module 114 can incorporate such interchangeability information into the similarity function. For example, when a component in a first data record is interchangeable with a component in the second data record, then the first data record and the second data record can be identified as similar, even when the actual component in the first data record is different from the actual component in the second data record.

In some embodiments, the SC module 114 can determine a likelihood of interchangeability between two components, and in some cases, the SC module 114 can do so by using the above illustrated process for determining importance of components or features. Referring to the example shown in FIG. 5, once the SC module 114 has determined that the data records 502, 504 are associated with the same cluster, the SC module 114 is configured to determine differences of components in attributes associated with the pair of data records 502, 504. Subsequently, the SC module 114 can determine every pair of components in the differences, and also count the number of times such pair appear across a large number of data records in the same cluster.

For example, the differences in the name attribute of the data records 502, 504 can include "Saint", "St" and "Restaurant," and every pair of components in the differences can include "Saint"—"St", "Saint"—"Restaurant", and "St"—"Restaurant". When the SC module 114 performs this operation over a large number of data records corresponding to the same cluster, "Saint"—"St" pair would likely appear many times, whereas "Saint"—"Restaurant" and "St"—"Restaurant" would not occur many times. As another example, the SC module 114 can learn that "Inc" is interchangeable with "Incorporated" and "Corp" and "Corporation" because there may be many data records referring to "3M Inc", "3M Corp", "3M Corporation" with the same address and phone number, where "Incorporated" and "Corp" and "Corporation" can be exchanged without any other data differences. Therefore, the SC module 114 can determine, based on the number of occurrences of the pair in the differences, how likely it is to be able to interchange a pair of components.

In some embodiments, the likelihood of interchangeability between a pair of components can be represented as an interchangeability score. The interchangeability score can be functionally related (e.g., linearly related or non-linearly related) to the number of occurrences of the pair in the differences. Once the SC module 114 learns a function or a rule that maps a pair into a interchangeability score, the SC module 114 can use the function or the rule to determine a similarity value of a pair of data records having those components.

In some embodiments, the SC module 114 can learn interchangeable pairs (or a function for determining interchangeability score) for each attribute independently. More particularly, the SC module 114 can learn and maintain a separate mechanism for computing an interchangeability score for each attribute. This can be important because interchangeable pairs may be different depending on attributes. For example, in the address attribute 506, "Street" and "St" are interchangeable instead of "St" and "Saint".

In some embodiments, the SC module 114 can be configured to learn the importance of a component and an interchangeability of a pair of components using a supervised learning technique. For example, the SC module 114 can learn the importance of a component and an interchangeability of a pair of components by performing pairwise comparisons using, for example, linear regression, kernel regression, non-parametric regression, random forest, or a graphical model.

In some embodiments, the SC module 114 is designed to tolerate missing attributes when determining a similarity between a pair of data records. In this context, the missing attribute scenario can include a scenario in which a component (e.g., a value) of an attribute is missing from a data record, or the attribute itself is missing from a data record.

Missing attribute problem is easy to address when the remaining attribute in the data record can uniquely identify an entity of a data record. For example, there is only one "Eiffel Tower" in the world, and the component "Eiffel Tower" of the name attribute can uniquely identify the entity of the data record, even if the data record does not include the address attribute (i.e., a component associated with the address attribute.) Unfortunately, not every attribute can uniquely identify an entity. For example, when two data records include "McDonalds" as their name attributes, the SC module 114 cannot determine that the two data records refer to the same McDonald's restaurant unless the data records also provide an address associated with the restaurant being referred to.

Figure 6:
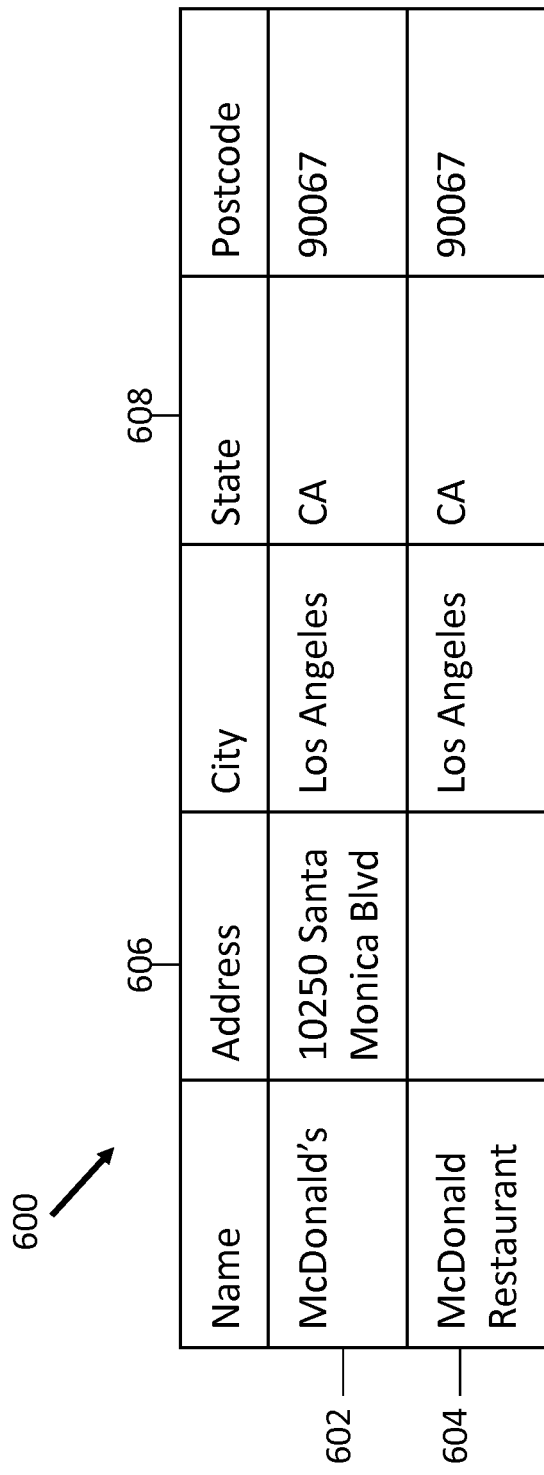
FIG. 6 illustrates a mechanism for determining a conditional probability for missing attributes in accordance with certain embodiments.

To address this issue, the SC module 114 can be configured to maintain a conditional probability table, indicating a likelihood that a missing attribute is associated with a particular component. FIG. 6 illustrates a mechanism for determining a conditional probability for missing attributes in accordance with certain embodiments. The two data records 602, 604 are associated with McDonald's restaurants. The first data record 602 has all attributes, but the second data records 604 is missing the address attribute 606. Because the remaining attributes cannot uniquely identify the McDonald's restaurant for the second data record, the SC module 114 is configured to determine a likelihood that the two records refer to the same restaurant by inferring a potential component for the address attribute 606 for the second data record 604. More particularly, the SC module 114 is configured to determine a probability of a blank attribute being a particular component.

To determine a probability of a missing (e.g., blank) attribute being a particular component, in some embodiments, the SC module 114 can be configured to take groups of attributes that can identify an entity and group them with one or more attributes removed.

More particularly, the SC module 114 can determine different combinations of known attributes corresponding to a particular entity/particular cluster (e.g. name attribute and phone number attribute, name attribute and address attribute, name attribute and city attribute, name attribute and city attribute and street address attribute, name attribute and postcode attribute, address attribute and phone attribute). Then, for each combination, the SC module 114 can make a list of all variations of a missing attribute from the set of known attributes associated with all records being considered. For example, if the combination of attributes includes the name attribute and the phone number attribute, the SC module 114 can make a list of address variations that have that name attribute and the phone number attribute.

Subsequently, the SC module 114 can compute a conditional probability that the missing attribute of a data record has a particular component given that the data record has the particular combination of known attributes. The SC module 114 can compute that conditional probability by, for example, dividing the number of distinct data records, having the particular combination of known attributes, having the missing attribute as the particular component given the total number of data records having the particular combination of known attributes.

For example, SC module 114 can infer that a missing street address attribute of one of Eiffel Tower's records can be determined with a probability of 1 given just the city attribute because there are no data records associated with the "Eiffel Tower" having a different address attribute given that the Eiffel Tower is in "Paris". As another example, referring to FIG. 5, the absence of the street address attribute, the data record 604 has a 1/560 chance of being the same "McDonalds" restaurant as the data record 602 because there are 560 separate McDonalds entities with the city attribute of "Los Angeles". The SC module 114 can then use this probability to create an attribute match score between the missing address attribute of the second data record 604 and the existing address attribute of the first data record 602. Thus, missing attributes does not necessarily result in a dissimilarity between data records except when there is ambiguity due to the missing attribute.

In step 206, one the SC module 114 computes the pairwise similarities between eligible pairs of data records, the CC module 116 can receive, from the SC module 114, the eligible pairs of data records and/or similarities between the eligible pairs of data records. Subsequently, the CC module 116 can cluster the received data records based on the similarities.

In some embodiments, the CC module 116 can use a graph clustering technique to cluster the data records. For example, each data record can be a node in a graph. An edge connecting two nodes can indicate that two data records corresponding to the two nodes are eligible for similarity computation, and a value associated with the edge can indicate an affinity (e.g., similarity) between the two data records corresponding to the nodes. The CC module 116 can use a graph clustering technique, such as a graph cut, to split clusters in the graph. The CC module 116 can control the number of clusters by controlling the clustering coefficient for the graph clustering technique.

In some embodiments, the CC module 116 can load the sets of pairs of data records into a graph processing system, allowing, among other things, one or more networked computers to store and process the unioned sets and the edges representing the similarity and other attributes of the connected components.

In some embodiments, the CC module 116 can modify edges in the graph to improve the clustering of data records. This technique is particularly useful when the CC module 116 uses a traversable graph, which includes an undirected graph that can be traversed by crossing each edge of the graph exactly once. The CC module 116 may identify one or more weak edges (e.g., low similarity or affinity between nodes being joined) that join two or more groups of highly self-similar data records. Such weak edges are likely to join otherwise well-defined clusters. Therefore, in some cases, the CC module 116 can choose to delete the one or more weak edges from the traversable graph. In other cases, the CC module 116 can request the SC module 114 to re-compute the affinity (e.g., similarity) of the weak edges to confirm that the edge indeed forms a weak connection of otherwise well-formed clusters of data records. The CC module 116 can provide this mechanism in conjunction with generalized graph frameworks/databases such as neo4j, jiraph, and titan.

In some embodiments, the CC module 116 can receive a clustering directive from a user, requiring the CC module 116 to associate two or more data records to the same cluster. The CC module 116 can be configured to store and apply clustering directives to rearrange data records in clusters based on explicit directives. To this end, the CC module 116 can provide an interface for users to group data records into clusters according to the user's preference so that certain data records, which were previously not deemed to belong to the same cluster, can be grouped together and data records, which were previously deemed to belong to the same cluster, can be separated into other clusters or into a new cluster.

FIGS. 7A-7B illustrates a process of applying a clustering directive to a set of clusters in accordance with some embodiments. FIG. 7A includes five data records grouped into two clusters 702, 704, where each cluster is identified using a cluster identifier, such as a universally unique identifier (UUID). Note that the CC module 116 incorrectly associated the data record C with the first cluster 702, and the CC module 116 incorrectly associated the data record E with the second cluster 704. A user can fix these errors by issuing a clustering directive 706, as illustrated in FIG. 7B. The cluster command in the clustering directive 706, ""clusters": {"uuid1": [["uuid1","A","B"],["uuid2","E"]], "uuid2": [["uuid1","C"],["uuid2","D"] . . . ]}", indicates that there should be two clusters, uuid1 and uuid2; that uuid1 should include three data records: A, B, and E; and that uuid2 should include two data records: C and D. Therefore, when the CC module 116 receives the clustering directive 706, the CC module 116 can reorganize the clusters and/or data records in the clusters in accordance with clustering directive 706.

In some embodiments, the clustering directive can be used by the CR module 112 during the candidate reduction process. For example, when the clustering directive 706 indicates that two or more data records belong to the same cluster, then the CR module 112 can remove the two data records from the similarity computation candidates or force the SC module 114 to associate a high similarity between the two or more data records. Similarly, when the clustering directive 706 indicates that two or more data records should belong to separate clusters, then the CR module 112 can remove the two data records from the similarity computation candidates or force the SC module 114 to associate a low similarity between the two or more data records.

In some embodiments, clustering directives can be maintained by the coordination module 118. The coordination module 118 can cause the CR module 112, the SC module 114, or the CC module 116 to process data records identified in clustering directives in accordance with the instructions in the clustering directives.

In some embodiments, the CC module 116 is configured to improve previously generated clusters. In particular, the CC module 116 can divide a cluster into sub clusters when the CC module realizes that data records in a single cluster can be better represented using two or more clusters. The CC module 116 can make such determination by considering a variety of clustering combinations on data records in the same cluster and by determining the clustering combination that reduces a cost function. The CC module 116 can also consider the overall similarity of clusters forms and relationships among data records of clusters. Once the CC module 116 determines that the data records should be divided into multiple clusters, the CC module 116 can rearrange data records in accordance with the determination.

In some embodiments, the CC module 116 can rearrange data records in clusters by taking into account cluster directives. For example, the CC module 116 can consider the cluster directives first to cluster data records as identified in the cluster directives, and the CC module 116 can add new data records to clusters for which there is no clustering directive. As another example, the CC module 118 can create revised clusters of records by first clustering data records identified in cluster directives and then repeatedly adding remaining data records in the complete set in, for example, a random order, where the complete set refers to all data records in consideration for this cluster. The complete set can include data records that were grouped by the CR module 112 using, for example, the bucketing process. Practically speaking, the complete set includes data records that are sufficiently similar that they should be considered together or in context. In determining whether to add a data record to a cluster, the CC module 118 can decide between adding the data record to an existing cluster and creating a new cluster for the data record. After multiple iterations of this approach, the CC module 118 can converge to a locally optimal set of clusters when applying, for example, a cost function with the desired relationship between penalizing decisions to group records that should not be grouped and decisions to not group records that should be grouped.

In some embodiments, the CC module 116 can cluster data records based on intra-cluster context. As an example, in a law practice or doctor's office, many distinct practitioners exist at the same address and phone number. On the other hand, it's unlikely that two similarly named restaurants exist as separate entities at the same address and phone number.

To this end, the CC module 116 can be configured to adjust one or more parameters for the clustering technique used to clustering data records (e.g., a minimum similarity value for two data records to be in the same cluster), depending on the kinds of data records in the cluster. For example, the CC module 116 can raise the similarity threshold when data records in the cluster primarily include a professional office, whereas the CC module 116 can reduce the similarity threshold when data records in the cluster primarily include a restaurant. As a further example, the CC module 116 may dynamically adjust one or more parameters to increase the repulsion (e.g., reduce the likelihood of clustering) between distinct clusters (or data records in clusters) that are known to share important attributes (or features). For instance, the CC module 116 is configured to adjust the similarity threshold to increase the repulsion between a hotel, a bar, and a restaurant at the same address and phone number.

One aspect of the disclosed grouping mechanism is the ability to compute a similarity between additional pairs of data records even after the grouping. In particular, the SC module 114 can be configured to compute a similarity between pairs of data records that have been grouped to the same cluster in step 206 but were not compared in step 204 because the CR module 112, in step 202, identified the pairs as ineligible for similarity computation. Computing the similarity between these pairs of data records can be useful because the grouping of these pairs into the same cluster relies on a rough transitivity property of similarity, which may be a weak indicator for grouping.

For example, suppose a data record A is deemed similar to a data record B, and the data record B is deemed similar to a data record C. After a clustering operation in step 206, data records A, B, and C are members of the same cluster, but the similarity of A and C is unknown because A-B and B-C were compared independently and the need to compare A-C was not established until records A and C have been grouped into the same cluster. Therefore, in step 208, the CR module 112 can identify these pairs of data records for additional comparison, and provide the identified pairs of data records to the SC module 114 so that the SC module 114 can perform additional similarity computations.

In some embodiments, the CC module 116 can identify pairs of data records for additional similarity computations by identifying pairs of records in the same cluster but have no similarity scores associated with them. In other embodiments, in case the CC module 116 represents the data records using a graph, the CC module 116 can identify the pairs of data records by identifying data records in the same cluster but for which there is no edge between the nodes representing the data records.

In some embodiments, the CC module 116 can be configured to add new data records to clusters that have already been formed. The CC module 116 can add such new data records to clusters in real-time.

Figure 8:
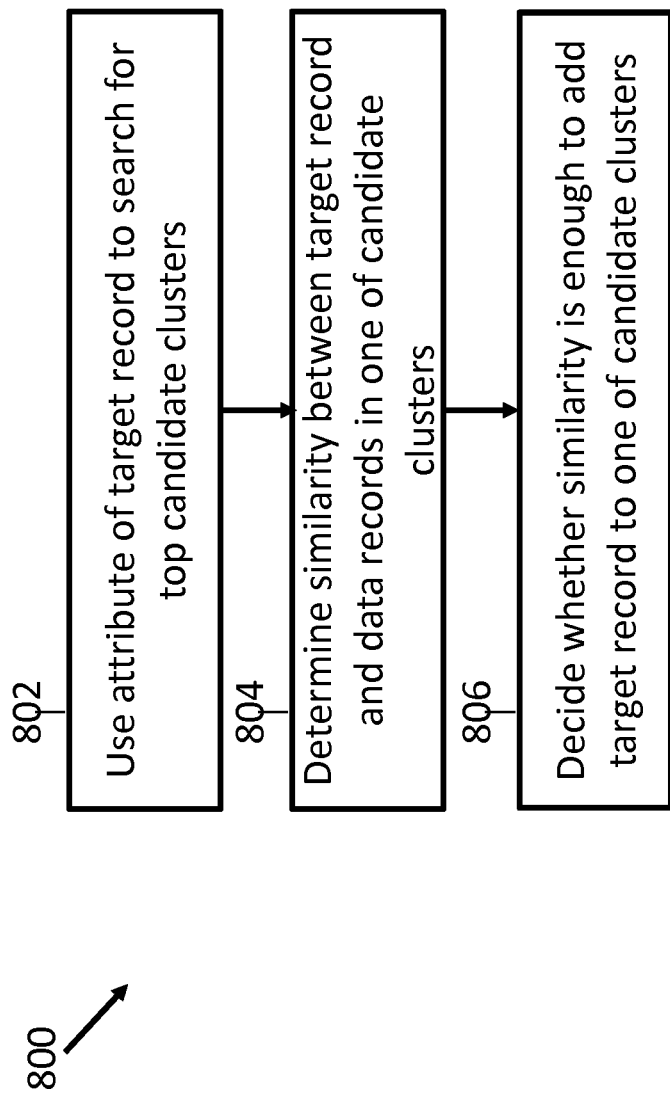
FIG. 8 illustrates a process for adding a data record to a cluster in accordance with some embodiments.

FIG. 8 illustrates a process for adding a data record to a cluster in accordance with some embodiments. The process 800 is exemplary and may be altered, e.g., by having steps added, removed, or rearranged. The coordination module 118 can be configured to coordinate this process in substantially real-time.

In step 802, the coordination module 118 can receive a data record to be added to one of the existing clusters. This data record can be referred to as a target record. Then the coordination module 118 can determine one or more candidate clusters for the target record based on one or more of attributes of the target record. In some cases, the coordination module 118 can use the one or more of attributes of the target record to search an index system or a database to determine one or more candidate clusters for the target record. For example, when a target record is associated with a street address attribute of "123 µm Street," the coordination module 118 can determine that the target record can be associated with the same cluster as the Saint Amour Restaurant of FIG. 5.

In step 804, the coordination module 118 can cause the SC module 114 to compute a similarity score between the target record and one or more data records from each of the candidate clusters. The coordination module 118 can select the one or more data records from each of the candidate clusters based on a number of edges associated with the one or more data records. For example, when a node corresponding to a data record has many edges coupled to other nodes in the same cluster, it may indicate that the data record can be representative of the particular cluster. Therefore, the coordination module 118 can select, for comparison with the target record, data records whose nodes have many edges to other nodes in the same cluster.

In step 806, once the SC module 114 computes the similarity scores between the target record and the one or more data records from each of the candidate clusters, the CC module 116 can use the similarity scores to determine the cluster to which the target record can be added. For example, the CC module 116 can choose the candidate cluster with which the target record has the highest similarity score. In some cases, the CC module 116 can indicate that the target record does not belong to any one of the candidate clusters because even the highest similarity score is not sufficiently high (e.g., the similarity score is lower than a predetermined threshold).

In some embodiments, the disclosed grouping mechanism can be performed in a distributed manner across a plurality of computing devices, such as a plurality of servers in a data center. The computations across the plurality of computing devices can be coordinated using a coordination module 118. In some embodiments, once the CR module 112 provides candidate pairs of data records on which to compute a similarity score, the coordination module 118 can divide up the candidate pairs of data records into a plurality of groups of candidate pairs, and provide a group of candidate pairs to one of the plurality of computing devices. In some embodiments, the coordination module 118 can divide up the candidate pairs into groups using a MapReduce technique or simply by creating n files of m candidate pairs, where n is the number of computing devices and m is the total number of candidate pairs divided by n.

In some embodiments, the coordination module 118 may also distribute the computation of the candidate data record pair selection step (e.g., step 202) across a plurality of computing devices. In other embodiments, the coordination module 118 may also distribute the clustering step (e.g., step 206) across a plurality of computing devices.

As discussed above, a similarity value between two data records can include data record identifiers of the two data records, at least one similarity score representing the similarity of the two data records, and, optionally, additional attributes. When some of the grouping operations, such as the similarity computations, are performed across a plurality of computing devices, the two data records represent a disjoint set such that data records of a cluster may exist on separate networked computers. In order to group data records into a cluster that may represent the same entity, it is desirable to collect the data records from the plurality of computing devices and create combined sets of records or clusters.

In some embodiments, the coordination module 118 can complete such grouping using a union-find operation. Particularly, the union-find operation can be performed over pairs of data records on one or more computers with either shared or synchronized memory. For example, the coordination module 118 can load pairs of data records into the memory of a single computing device, perform a union-find operation to union all appropriate data records, and provide a set of clusters represented by the input pairs of data records.

FIG. 9 illustrates a union-find operation to merge pairs of data records into clusters in accordance with some embodiments. The coordination module 118 can receive a plurality of pairs of data records, as illustrated in column 902, and perform a union-find operation to find clusters represented by the plurality of pairs of data records, as illustrated in column 904.

In some embodiments, a coordination module 118 in each of the plurality of computing devices can perform a union-find operation on pairs of data records maintained by the associated computing device. This allows each coordination module 118 to identify clusters generated by the associated computing device. Then the coordination modules 118 can provide the identified clusters to a central coordination module (e.g., a coordination module that distributed the grouping operation to a plurality of computing devices), and the central coordination module can perform a union-find operation on the received clusters to determine a set of clusters generated by the plurality of computing devices jointly.

In some embodiments, the disclosed grouping mechanism can use previously generated clusters to improve subsequent grouping operations. As an example, the CR module 112 may maintain a table of how many data records in a particular cluster have a particular attribute or attribute token, as determined by a previous grouping operation. The CR module 112 can use this table to improve the bucketing operation for identifying eligible pairs of data records for the SC module 114. More particularly, the CR module 112 can use this table to determine a ratio of good comparisons (records in the same cluster) to bad comparisons (records not in the same cluster) that were made based on certain bucketing criteria. For example, the CR module 112 can determine how many data records from the same bucket (for example, data records with particular attribute or set of attributes in common) ended up in the same cluster. If the ratio of (1) a number of data records that ended up in the same cluster to (2) a number of data records in the same bucket is low, then the CR module 112 can determine that the prior bucketing criteria was inefficient.

Subsequently, the CR module 112 can tune the bucketing criteria to avoid bad comparisons while skipping as few good comparisons as is tolerated. This process allows the CR module 112 to create complex bucketing strategies, for example, identifying attributes or sets of attributes that provide a good ratio of matches to total comparisons. Through this process, the CR module 112 can also subdivide attributes, such as generating bigrams or trigrams from the name attribute or the address attribute, to identify sets of data records that should be included for further comparisons. Also, the CR module 112 can also help tune hashing approaches, such as simhash or minhash, by informing which elements to consider (or exclude) for hashing.

In some embodiments, the coordination module 118 can be configured to compute one or more automated scores to measure the performance of various components of the grouping mechanism. Such automated scores are produced from measured aspects and by scoring against ground truth clusters. Measured aspects may include number of good comparisons, number of bad comparisons, average time of comparisons, and/or graph diameter. Ground truth scored aspects include number of overfolds (data records grouped inappropriately), number of underfolds (data records not grouped that should have been), and/or composite functions combining various scores to optimize for preferences such as "it's more okay to underfold than overfold".

As an example, the coordination module 118 may receive a set of data records and the ground-truth cluster associated with each of the data records. The coordination module 118 can then run the data records through the CR module 112, the SC module 114, and the CC module 116 and compare the computed clusters to the originally annotated clusters. Then the coordination module 118 can compute a score for the computed clusters, applying the appropriate score penalty for each deviation.

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The terms "a" or "an," as used herein throughout the present application, can be defined as one or more than one. Also, the use of introductory phrases such as "at least one" and "one or more" should not be construed to imply that the introduction of another element by the indefinite articles "a" or "an" limits the corresponding element to only one such element. The same holds true for the use of definite articles.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. An apparatus comprising:
a processor configured to acquire instructions stored in one or more memories and execute the instructions to:
receive a plurality of data records from a plurality of data sources, wherein each of the data records includes a plurality of attributes describing an entity;
identify a pair of data records from the received data records and determine whether the pair of data records is eligible or ineligible for a similarity value determination based on a predetermined set of attributes shared by the plurality of attributes of the pair of data records;
exclude the pair of data records from the similarity value determination when the step of determining eligibility determines that the pair of data records is ineligible;
process the pair of data records through the similarity value determination when the step of determining eligibility determines that the pair of data records is eligible, wherein the similarity value determination includes determining a similarity value for the pair of data records based on similarity between the plurality of attributes in one data record in the pair and the plurality of attributes in another data record in the pair;
provide one or more clusters, wherein each of the clusters is configured to store data records of an unique entity, and associate the pair of data records with one of the clusters based on the similarity value for the pair of data records, wherein the cluster to which the pair of data records is associated is configured to store data records of the entity described by the plurality of attributes;
compare, after the step of associating the pair of data records with the cluster, the plurality of attributes in the pair of data records with attributes of other data records in the cluster, and determine one or more attribute differences;
determine at least one importance score for one or more first attributes in the plurality of attributes based on the determined attribute differences, wherein the determined importance score is used by the similarity value determination as a factor in modifying weights of the first attributes for determining the similarity value; and identify another pair of data records and process the other pair of data records through the similarity value determination;

wherein each of the other pair of data records includes a second plurality of attributes; and wherein the similarity value determination includes determining that the second plurality of attributes includes the first attributes, and determining the similarity value for the other pair of data records using the modified weights.

2. The apparatus of claim 1, wherein the processor is configured to adjust the predetermined set of attributes based on association of pairs of data records to the clusters from a previous iteration.

3. The apparatus of claim 1, wherein the processor is configured to determine the similarity value based on a similarity function learned from training data records.

4. The apparatus of claim 3, wherein the similarity function is to determine the importance score of a component associated with the first attribute, wherein the similarity function is to be learned by:

determining differences between components associated with the first attribute of the training data records, wherein the training data records are known belong to the same cluster; and determining the importance score of the component based on a number of times the component appears in the differences.

5. The apparatus of claim 4, wherein the similarity function is to infer a likelihood of interchanging a first component in a particular attribute of a data record with a second component, wherein the similarity function is to be learned by:

determining differences between components associated with the particular attribute of the training data records, wherein the training data records are known belong to the same cluster; and determining the likelihood of interchanging the first component with the second component based on a number of times the first component and the second component appears in the differences at the same time.

6. The apparatus of claim 4, wherein the similarity function is to determine a conditional likelihood that a missing attribute of a data record has a particular component, wherein the conditional likelihood is to be determined by:

determining a combination of known attributes corresponding to a particular entity; determining all variations of a missing attribute amongst data records of the particular entity having the combination of known attributes; and determining a conditional probability, based on the variations of the missing attribute, that the missing attribute has a particular component given that the data record has the particular combination of known attributes.

7. The apparatus of claim 1, wherein the processor is configured to:

represent the plurality of data records as a plurality of nodes in a graph;

represent the similarity value for the pair of data records as at least one edge between nodes, in the graph, corresponding to the pair of data records; and determine the provided one or more clusters from the graph.

8. The apparatus of claim 7, wherein the processor is configured to determine the provided one or more clusters based on the graph using a graph clustering technique.

9. The apparatus of claim 1, wherein the processor is configured to receive a clustering directive instructing the processor to associate the pair of data records with the cluster configured to store data records of the entity described by the plurality of attributes of the pair of data records.

10. The apparatus of claim 1, wherein the processor is configured to:

associate at least one of the plurality of data records to the cluster configured to store data records of the entity described by the plurality of attributes of the pair of data records using a clustering technique; and adjust a parameter for the clustering technique based on data records in the cluster configured to store data records of the entity described by the plurality of attributes of the pair of data records.

11. The apparatus of claim 1, wherein the processor is configured to determine the similarity value for the pair of data records by receiving the similarity value for the pair of data records from another computing device.

12. The apparatus of claim 1, wherein the processor is configured to:

process a plurality of sub-clusters received from a plurality of computing devices that are independently identified at the plurality of computing devices; and perform a union-find operation on the plurality of sub-clusters to identify the cluster configured to store data records of the entity described by the plurality of attributes of the pair of data records.

13. A method comprising:

receiving, by a processor, a plurality of data records from a plurality of data sources, wherein each of the data records includes a plurality of attributes describing an entity;

identifying, by the processor, a pair of data records from the received data records and determining, by the processor, whether the pair of data records is eligible or ineligible for a similarity value determination based on a predetermined set of attributes shared by the plurality of attributes of the pair of data records;

excluding, by the processor, the pair of data records from the similarity value determination when the step of determining eligibility determines that the pair of data records is ineligible;

processing, by the processor, the pair of data records through the similarity value determination when the step of determining eligibility determines that the pair of data records is eligible, wherein the similarity value determination includes determining a similarity value for the pair of data records based on similarity between the plurality of attributes in one data record in the pair and the plurality of attributes in another data record in the pair;

providing, by the processor, one or more clusters, wherein each of the clusters is configured to store data records of an unique entity, and associating, by the processor, the pair of data records with one of the clusters based on the similarity value for the pair of data records, wherein the cluster to which the pair of data records is associated is configured to store data records of the entity described by the plurality of attributes;

comparing, after the step of associating the pair of data records with the cluster, by the processor, the plurality of attributes in the pair of data records with attributes of other data records in the cluster, and determining, by the processor, one or more attribute differences;

determining, by the processor, at least one importance score for one or more first attributes in the plurality of attributes based on the determined attribute differences, wherein the determined importance score is used by the similarity value determination as a factor in modifying weights of the first attributes for determining the similarity value; and identifying, by the processor, another pair of data records and processing, by the processor, the other pair of data records through the similarity value determination;

wherein each of the other pair of data records includes a second plurality of attributes; and wherein the similarity value determination includes determining that the second plurality of attributes includes the first attributes, and determining the similarity value for the other pair of data records using the modified weights.

14. The method of claim 13, further comprising adjusting, by the processor, the predetermined set of attributes based on association of data records to clusters from a previous iteration.

15. The method of claim 13, further comprising determining, by the processor, the similarity value based on a similarity function learned from training data records.

16. The method of claim 15, wherein the similarity function is to determine the importance score of a component associated with the first attribute.

17. The method of claim 15, wherein the similarity function is to infer a likelihood of interchanging a first component in a particular attribute of a data record with a second component.

18. A computer program product, tangibly embodied in a non-transitory computer-readable storage medium, the computer program product including instructions executable by a processor to:

receive a plurality of data records from a plurality of data sources, wherein each of the data records includes a plurality of attributes describing an entity;

identify a pair of data records from the received data records and determine whether the pair of data records is eligible or ineligible for a similarity value determination based on a predetermined set of attributes shared by the plurality of attributes of the pair of data records;

exclude the pair of data records from the similarity value determination when the step of determining eligibility determines that the pair of data records is ineligible;

process the pair of data records through the similarity value determination when the step of determining eligibility determines that the pair of data records is eligible, wherein the similarity value determination includes determining a similarity value for the pair of data records based on similarity between the plurality of attributes in one data record in the pair and the plurality of attributes in another data record in the pair;

provide one or more clusters, wherein each of the clusters is configured to store data records of an unique entity, and associate the pair of data records with one of the clusters based on the similarity value for the pair of data records, wherein the cluster to which the pair of data records is associated is configured to store data records of the entity described by the plurality of attributes;

compare, after the step of associating the pair of data records with the cluster, the plurality of attributes in the pair of data records with attributes of other data records in the cluster, and determine one or more attribute differences;

determine at least one importance score for one or more first attributes in the plurality of attributes based on the determined attribute differences, wherein the determined importance score is used by the similarity value determination as a factor in modifying weights of the first attributes for determining the similarity value; and identify another pair of data records and process the other pair of data records through the similarity value determination;

wherein each of the other pair of data records includes a second plurality of attributes; and wherein the similarity value determination includes determining that the second plurality of attributes includes the first attributes, and determining the similarity value for the other pair of data records using the modified weights.

19. The computer program product of claim 18, wherein the instructions are executable by the processor to adjust the predetermined set of attributes based on association of pairs of data records to the clusters from a previous iteration.

20. The computer program product of claim 18, wherein the instructions are executable by the processor to determine the similarity value based on a similarity function learned from training data records.

21. The computer program product of claim 20, wherein the similarity function is to determine the importance score of a component associated with the first attribute.

22. The computer program product of claim 20, wherein the similarity function is to infer a likelihood of interchanging a first component in a particular attribute of a data record with a second component.

* * * * *